(12) United States Patent
Kawamura et al.

(10) Patent No.: US 9,465,204 B2
(45) Date of Patent: Oct. 11, 2016

(54) ZOOM LENS AND IMAGE PICKUP APPARATUS USING THE SAME

(71) Applicant: OLYMPUS CORPORATION, Tokyo (JP)

(72) Inventors: Kazuteru Kawamura, Tokyo (JP); Akiko Naito, Tokyo (JP); Keitaro Yokoyama, Tokyo (JP); Toshio Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 56 days.

(21) Appl. No.: 14/290,256

(22) Filed: May 29, 2014

(65) Prior Publication Data

US 2014/0354858 A1 Dec. 4, 2014

(30) Foreign Application Priority Data

May 30, 2013 (JP) .................................. 2013-114628

(51) Int. Cl.
*G02B 15/14* (2006.01)
*G02B 9/60* (2006.01)
*G02B 15/177* (2006.01)
*G02B 13/00* (2006.01)
*G02B 5/00* (2006.01)
*G02B 13/04* (2006.01)
*G02B 15/20* (2006.01)
*G03B 13/18* (2006.01)

(52) U.S. Cl.
CPC ............. *G02B 15/177* (2013.01); *G02B 5/005* (2013.01); *G02B 9/60* (2013.01); *G02B 13/009* (2013.01); *G02B 13/0045* (2013.01); *G02B 13/04* (2013.01); *G02B 15/14* (2013.01); *G02B 15/20* (2013.01); *G03B 13/18* (2013.01)

(58) Field of Classification Search
CPC .... G02B 15/14; G02B 13/009; G02B 13/18; G02B 15/20; G02B 13/04; G02B 13/0045; G02B 15/177; G02B 9/60; G02B 5/005
USPC ....... 359/683, 686, 689, 716, 740, 749, 753, 359/771, 781, 784
See application file for complete search history.

(56) References Cited

U.S. PATENT DOCUMENTS

| 8,446,512 | B2 | 5/2013 | Ichikawa et al. |
| 2012/0162779 | A1 | 6/2012 | Imaoka |
| 2012/0229903 | A1* | 9/2012 | Matsumura .......... G02B 27/646 |
| | | | 359/557 |
| 2015/0316753 | A9* | 11/2015 | Hosoi ................... G02B 15/14 |
| | | | 359/686 |

FOREIGN PATENT DOCUMENTS

| JP | 2012-058406 | 3/2012 |
| JP | 2012-133230 | 7/2012 |

* cited by examiner

*Primary Examiner* — Evelyn A Lester
(74) *Attorney, Agent, or Firm* — Kenyon & Kenyon LLP

(57) ABSTRACT

A zoom lens includes a first lens unit having a negative refractive power, a second lens unit having a positive refractive power, and a third lens unit having a negative refractive power. At the time of zooming, distances between the lens units change, and a distance between the first lens unit and the second lens unit at a telephoto end is shorter than at a wide angle end. An aperture stop is disposed on the image side of an image-side surface of the first lens unit, and on the object side of an image-side surface of the second lens unit. The second lens unit includes two sub lens units. The object-side sub lens unit in the second lens unit includes one lens component. The following conditional expressions are satisfied.

$$3.0 < \Delta D_{12}/ER_S < 4.5$$

$$1.05 < |f_3/f_{UN21}| < 2.1$$

37 Claims, 16 Drawing Sheets

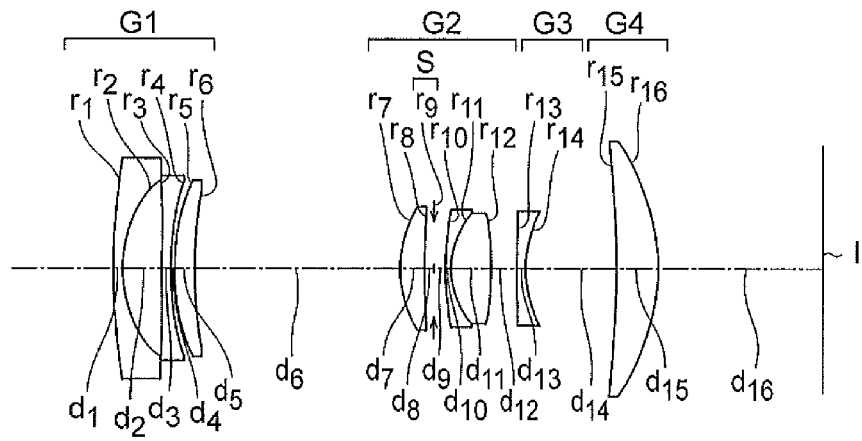
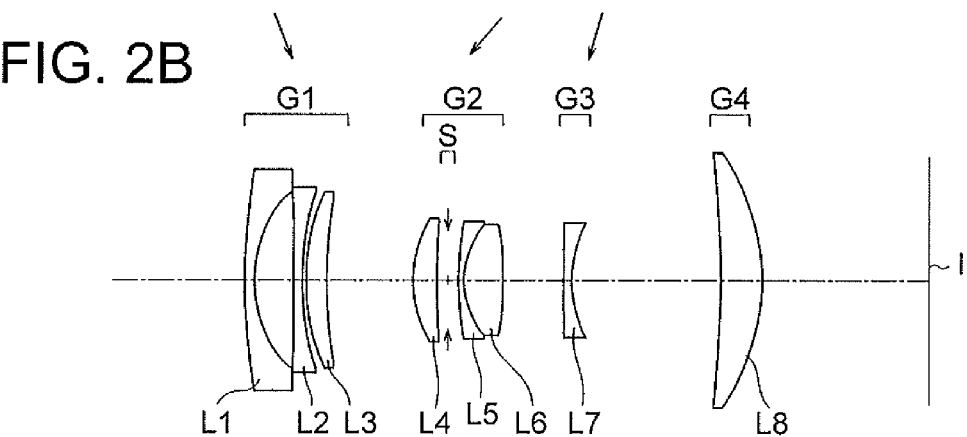
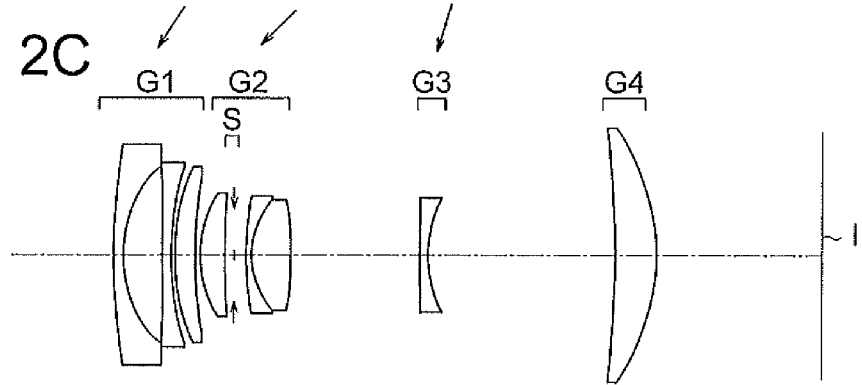

SA
FNO 3.596

AS
FIY 11.15

DT
FIY 11.15

CC
FIY 11.15

SA
FNO 4.418

AS
FIY 11.15

DT
FIY 11.15

CC
FIY 11.15

SA
FNO 5.802

AS
FIY 11.15

DT
FIY 11.15

CC
FIY 11.15

435.84 --------
486.13 —-—-—
656.27 ··········
587.56 ———

SA
FNO 3.645

-0.20   0.20
(mm)

AS
FIY 11.15

-0.20   0.20
(mm)

DT
FIY 11.15

-10.00   10.00
(%)

CC
FIY 11.15

-0.02   0.02
(mm)

SA
FNO 4.422

-0.20   0.20
(mm)

AS
FIY 11.15

-0.20   0.20
(mm)

DT
FIY 11.15

-10.00   10.00
(%)

CC
FIY 11.15

-0.02   0.02
(mm)

SA
FNO 5.731

-0.20   0.20
(mm)

AS
FIY 11.15

-0.20   0.20
(mm)

DT
FIY 11.15

-10.00   10.00
(%)

CC
FIY 11.15

-0.02   0.02
(mm)

SA
FNO 3.640

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 4.518

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 5.738

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 3.645

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 4.697

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 5.798

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 3.707

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 4.483

-0.20  0.20
(mm)

AS
FIY 11.15

-0.20  0.20
(mm)

DT
FIY 11.15

-10.00  10.00
(%)

CC
FIY 11.15

-0.02  0.02
(mm)

SA
FNO 5.828

-0.20  0.20
(mm)

AS
FIY 11.15

-0.20  0.20
(mm)

DT
FIY 11.15

-10.00  10.00
(%)

CC
FIY 11.15

-0.02  0.02
(mm)

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2013-114628 filed on May 30, 2013; the entire contents of which are incorporated herein by reference.

BACKGROUND OF THE INVENTION

1. Field of the Invention

The present invention relates to a zoom lens and an image pickup apparatus using the same.

2. Description of the Related Art

In cameras, according to an application and need, the number of pixels is increased by making an image pickup surface area of an image pickup element large, thereby facilitating an improvement in an image quality, and conversely, by making the image pickup surface area small, small-sizing of camera is carried out. Here, various types of optical systems are used in cameras, and one of these optical systems includes a zoom lens. The zoom lens is also used in an interchangeable lens (lens that is detachable from a camera main-body).

If the image pickup surface area is large, an image formed on the image pickup surface also becomes large. In a camera in which, the image pickup surface area is large, the zoom lens is susceptible to become large. Therefore, a zoom lens for the camera with the large image pickup surface area is sought to have both, a favorable optical performance and a favorable portability. In other words, in a zoom lens, it is sought that an aberration from a center of an image to a periphery has been corrected favorably, and that the zoom lens has a small size. Both the favorable optical performance and the favorable portability have also been sought in a zoom lens for a camera with a small image pickup surface area.

Zoom lenses fulfilling these requirements are disclosed in Japanese Patent Application Laid-open Publication Nos. 2012-133230 and 2012-58406. The zoom lens in Japanese Patent Application Laid-open Publication No. 2012-133230 and the zoom lens in Japanese Patent Application Laid-open Publication No. 2012-58406, include in order from an object side, a lens unit having a negative refractive power, a lens unit having a positive refractive power, a lens unit having a negative refractive power, and a lens unit having a positive refractive power. The zoom lens in Japanese Patent Application Laid-open Publication No. 2012-133230 and the zoom lens in Japanese Patent Application Laid-open Publication No. 2012-58406 are comparatively small-sized and have a wide angle of view at a wide angle end.

SUMMARY OF THE INVENTION

A zoom lens according to a first aspect of the present invention includes in order from an object side to an image side a first lens unit having a negative refractive power,
a second lens unit having a positive refractive power, and
a third lens unit having a negative refractive power, and
at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (1) and (2) are satisfied.

$$3.0 < \Delta D_{12}/ER_S < 4.5 \quad (1)$$

$$1.05 < |f_3/f_{UN21}| < 2.1 \quad (2)$$

where, $\Delta D_{12} = D_{12W} - D_{12T}$, $D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $ER_S$ denotes the maximum radius of an opening of the aperture stop, $f_3$ denotes a focal length of the third lens unit, and $f_{UN21}$ denotes a focal length of the object-side sub lens unit in the second lens unit.

A zoom lens according to a second aspect of the present invention includes in order from an object side to an image side a first lens unit having a negative refractive power,
a second lens unit having a positive refractive power, and
a third lens unit having a negative refractive power, and
at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (1) and (3) are satisfied.

$$3.0 < \Delta D_{12}/ER_S < 4.5 \quad (1)$$

$$-0.9 < SF_{2N} < 1.5 \quad (3)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $ER_S$ denotes the maximum radius of an opening of the aperture stop, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

A zoom lens according to a third aspect of the present invention includes in order from an object side to an image side a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the following conditional expressions (4) and (5') are satisfied.

$$1.2 < \Delta D_{12}/IH_{MAX} < 1.85 \quad (4)$$

$$1.1 < |f_3/f_W| < 1.9 \quad (5')$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $IH_{MAX}$ denotes the maximum image height, and denotes the maximum value in a case in which, the maximum image height changes with zooming, $f_3$ denotes a focal length of the third lens unit, and $f_W$ denotes a focal length of the overall zoom lens system at the time of infinite object point focusing at the wide angle end.

A zoom lens according to a fourth aspect of the present invention includes in order from an object side to an image side a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the following conditional expressions (4) and (6) are satisfied.

$$1.2 < \Delta D_{12}/IH_{MAX} < 1.85 \quad (4)$$

$$0.43 < \Sigma_{2G}/f_2 < 0.78 \quad (6)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $IH_{MAX}$ denotes the maximum image height, and denotes the maximum value in a case in which, the maximum image height changes with zooming, $\Sigma_{2G}$ denotes a thickness on an optical axis of the second lens unit, and $f_2$ denotes a focal length of the second lens unit.

A zoom lens according to a fifth aspect of the present invention includes in order from an object side to an image side a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (7), (8), and (9) are satisfied.

$$0.6 < f_{UN21}/f_2 < 1.8 \quad (7)$$

$$1.17 < |f_3/f_2| < 1.95 \quad (8)$$

$$1.15 < f_2/IH_{MAX} < 1.5 \quad (9)$$

where, $f_{UN21}$ denotes a focal length of the object-side sub lens unit in the second lens unit, $f_2$ denotes a focal length of the second lens unit, $f_3$ denotes a focal length of the third lens unit, and IH$_{MAX}$ denotes the maximum image height, and denotes the maximum value in a case in which, the maximum image height changes with zooming.

A zoom lens according to a sixth aspect of the present invention includes in order from an object side to an image side a first lens unit having a negative refractive power,
a second lens unit having a positive refractive power, and
a third lens unit having a negative refractive power, and
at the time of zooming, distances between the lens units change, and
a distance between the first lens unit and the second lens unit at a telephoto end is shorter than a distance between the first lens unit and the second lens unit at a wide angle end, and
an aperture stop is disposed on the image side of an image-side surface of the first lens unit, and on the object side of an image-side surface of the second lens unit, and
the first lens unit includes in order from the object side to the image side, an object-side sub lens unit and an image-side sub lens unit, and
the object-side sub lens unit in the first lens unit includes a first negative lens, and
the image-side sub lens unit in the first lens unit includes a second negative lens and a first positive lens, and
the second lens unit includes in order from the object side to the image side, an object-side sub lens unit having a positive refractive power, and an image-side sub lens unit, and
the object-side sub lens unit in the second lens unit includes one lens component, and
in the lens component, only two surfaces, namely, an object-side surface and an image-side surface, are in contact with air in an optical path, and
the image-side sub lens unit in the second lens unit includes a lens surface having a negative refractive power and a positive lens which is disposed on the image side of the lens surface, and
the following conditional expressions (3), (10) and (11) are satisfied.

$$-0.9 < SF_{2N} < 1.5 \quad (3)$$

$$1.5 < f_{UN21}/ER_S < 3.9 \quad (10)$$

$$3 < LTL_{min}/fb_{LTLmin} < 13 \quad (11)$$

where, $$SF_{2N} = (R_{2NO} + R_{2NI})/(R_{2NO} - R_{2NI}),$$

R$_{2NO}$ denotes a paraxial radius of curvature of an object-side surface of the second negative lens in the first lens unit, and
R$_{2NI}$ denotes a paraxial radius of curvature of an image-side surface of the second negative lens in the first lens unit,
f$_{UN21}$ denotes a focal length of the object-side sub lens unit in the second lens unit,
ER$_S$ denotes the maximum radius of an opening of the aperture stop,
LTL$_{min}$ denotes a sum of an overall length of the zoom lens at the time of infinite object point focusing and an air-converted back focus, and is the minimum value thereof in a case in which, the overall length changes with zooming, and
the overall length is a distance on an optical axis from a refracting surface of the zoom lens nearest to the object side and a refracting surface of the zoom lens nearest to the image side, and fb$_{LTLmin}$ denotes the air-converted back focus at LTL$_{min}$.

According to a seventh aspect of the present invention, a zoom lens includes in order from an object side to an image side a first lens unit having a negative refractive power,
a second lens unit having a positive refractive power, and
a third lens unit having a negative refractive power, and
at the time of zooming, distances between the lens units change, and
a distance between the first lens unit and the second lens unit at a telephoto end is shorter than a distance between the first lens unit and the second lens unit at a wide angle end, and
an aperture stop is disposed on the image side of an image-side surface of the first lens unit, and on the object side of an image-side surface of the second lens unit, and
the second lens unit includes in order from the object side to the image side, an object-side sub lens unit having a positive refractive power, and an image-side sub lens unit, and
the object-side sub lens unit in the second lens unit includes one lens component, and
in the lens component, only two surfaces, namely, an object-side surface and an image-side surface, are in contact with air in an optical path, and
the following conditional expressions (2) and (4) are satisfied.

$$1.05 < |f_3/f_{UN21}| < 2.1 \quad (2)$$

$$1.2 < \Delta D_{12}/IH_{MAX} < 1.85 \quad (4)$$

where,
f$_3$ denotes a focal length of the third lens unit, and
f$_{UN21}$ denotes a focal length of the object-side sub lens unit in the second lens unit, $$\Delta D_{12} = D_{12W} - D_{12T},$$

D$_{12W}$ denotes the distance between the first lens unit and the second lens unit at the wide angle end,
D$_{12T}$ denotes the distance between the first lens unit and the second lens unit at the telephoto end,
both D$_{12W}$ and D$_{12T}$ are distances on an optical axis at the time of infinite object point focusing, and
IH$_{MAX}$ denotes the maximum image height, and denotes the maximum value in a case in which, the maximum image height changes with zooming.

An image pickup apparatus according to the present invention includes
a zoom lens, and
an image pickup element which has an image pickup surface, and which converts an image formed on the image pickup surface by the zoom lens, to an electric signal, and
the zoom lens is one of the aforementioned zoom lenses.

BRIEF DESCRIPTION OF THE DRAWINGS

FIG. 1A shows a cross-sectional view at a wide angle end, FIG. 1B shows a cross-sectional view in an intermediate focal length state, and FIG. 1C shows a cross-sectional view at a telephoto end;

FIG. 2A, FIG. 2B, and FIG. 2C are lens cross-sectional views at the time of infinite object point focusing of a zoom lens according to an example 2 of the present invention, where, FIG. 2A shows a cross-sectional view at a wide angle end, FIG. 2B shows a cross-sectional view in an intermediate focal length state, and FIG. 2C shows a cross-sectional view at a telephoto end;

FIG. 3A shows a cross-sectional view at a wide angle end, FIG. 3B shows a cross-sectional view in an intermediate focal length state, and FIG. 3C shows a cross-sectional view at a telephoto end;

FIG. 4A shows a cross-sectional view at a wide angle end, FIG. 4B shows a cross-sectional view in an intermediate focal length state, and FIG. 4C shows a cross-sectional view at a telephoto end;

FIG. 5A shows a cross-sectional view at a wide angle end, FIG. 5B shows a cross-sectional view in an intermediate focal length state, and FIG. 5C shows a cross-sectional view at a telephoto end;

DETAILED DESCRIPTION OF THE INVENTION

Figure 1A:
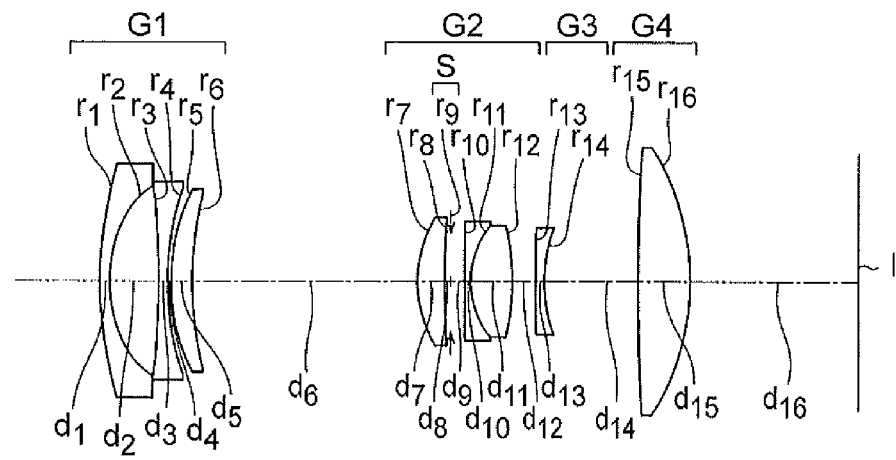
FIG. 1A, FIG. 1B, and FIG. 1C are lens cross-sectional views at the time of infinite object point focusing of a zoom lens according to an example 1 of the present invention, where.

Exemplary embodiments and examples of a zoom lens and an image pickup apparatus using the same will be described below in detail by referring to the accompanying diagrams. However, the present invention is not restricted to the embodiments and examples described below.

In a zoom lens according to the present embodiment, the overall length of the zoom lens is shortened, and a half angle of view of 33 degrees, and furthermore more than 36 degrees, is secured at a wide angle end, and a zooming ratio more than 2.8 times is achieved. In order to achieve these specifications, in the zoom lens according to the present embodiment, an optical system with the number of lenses that will not hinder the shortening of the overall length of the zoom lens, and a symmetrical arrangement of refractive power, has been realized.

More specifically, in the zoom lens according to the present embodiment, in order to prevent hindering of shortening of the overall length of the zoom lens, the number of lenses in each lens unit is reduced to be small, and accordingly, an overall thickness of lenses in each lens unit is made small. Moreover, by imparting a refractive power arrangement of a negative refractive power, a positive refractive power, and a negative refractive power in order from an object side to an image side, the optical system is built such that the refractive power arrangement from the wide angle end to a telephoto end comes closer to a symmetrical form.

An arrangement of the zoom lens according to the present embodiment will be described below. Firstly, the basic arrangement will be described.

In the basic arrangement of the zoom lens according to the present embodiment, the zoom lens includes in order from the object side to the image side, a first lens unit having a negative refractive power, a second lens unit having a positive refractive power, and a third lens unit having a negative refractive power. At the time of zooming, distances between the lens units change, and a distance between the first lens unit and the second lens unit at a telephoto end is shorter than a distance between the first lens unit and the second lens unit at a wide angle end. An aperture stop is disposed on the image side of an image-side surface of the first lens unit, and on the object side of an image-side surface of the second lens unit.

By making such an arrangement, from the wide angle end to the telephoto end, or in other words, in the total zoom range, it becomes easy to make an arrangement such that the refractive power arrangement becomes a symmetrical arrangement with the second lens unit (aperture stop) at the center. Therefore, even if the overall length of the zoom lens at the wide angle end is shortened by decreasing the number of lenses, it is possible to suppress degradation of various aberrations due to decrease in the number of lenses. In such manner, in the basic arrangement, small-sizing of the optical system and securing a stable optical performance throughout the total zoom range are facilitated. The stable optical performance means that the occurrence of various aberrations and fluctuation thereof are suppressed sufficiently.

Next, preferable arrangements and preferable conditional expressions will be described below.

In the zoom lens according to the present embodiment, it is preferable that the first lens unit includes in order from the object side to the image side, an object-side sub lens unit and an image-side sub lens unit. Moreover, it is preferable that the object-side sub lens unit in the first lens unit includes a first negative lens, and the image-side sub lens unit in the first lens unit includes a second negative lens and a first positive lens.

By forming the object-side sub lens unit in the first lens unit by the first negative lens, and making the negative refractive power of the first negative lens large, it is possible to bring an entrance pupil closer to the object side. By making such an arrangement, it is possible to contribute to securing a large angle of view at the wide angle end, and making a diameter of the optical system small.

However, if the refractive power of the first negative lens is made large, an astigmatism is susceptible to occur near the wide angle end, and a spherical aberration and a coma are susceptible to occur near the telephoto end. By letting the image-side sub lens unit, have the abovementioned arrangement, it is possible to suppress an occurrence of aberration in the entire first lens unit. As a result, a stable optical performance in the total zoom range is achieved.

It is preferable to let the first negative lens to be a negative meniscus lens having a convex surface directed toward the object side. By making such an arrangement, an amount of the astigmatism and the coma occurring in the first negative lens is reduced, thereby reducing aberrations occurring in the first lens unit.

Moreover, in the zoom lens according to the present embodiment, it is preferable that the second lens unit includes in order from the object side to the image side, an object-side sub lens unit having a positive refractive power and an image-side sub lens unit. Moreover, it is preferable that the object-side sub lens unit in the second lens unit includes one lens component, and in the lens component, only two surfaces, namely, an object-side surface and an image-side surface, are in contact with air in the optical path.

The second lens unit is positioned near the aperture stop. Therefore, the second lens unit is involved largely in the occurrence of the spherical aberration and the coma. Therefore, by including the object-side sub lens unit and the image-side sub lens unit in the second lens unit as aforementioned, it is possible to negate the spherical aberration and the coma occurred in the sub lens unit by two sub lens units. In such manner, it is possible to adopt an arrangement which enables to correct favorably the spherical aberration and the coma in the second lens unit. Moreover, by securing appropriately an air space between the two sub lens units, an effect of correction of astigmatism is achieved.

Moreover, in the zoom lens according to the present embodiment, it is preferable that the image-side sub lens unit in the second lens unit has a lens surface having a negative refractive power, and a positive lens that is disposed on the image side of the lens surface.

By making such an arrangement, it is possible to improve further the balance of symmetry of the refractive power arrangement, or a balance related to a magnitude of the negative refractive power in particular. In such manner, by improving the balance of magnitude of the refractive power, further improvement in the stable optical performance throughout the total zoom range is carried out while carrying out small-sizing of the optical system by making the refractive power of the second lens unit large.

Moreover, in the zoom lens according to the present embodiment, it is preferable that the following conditional expression (1) is satisfied.

$$3.0 < \Delta D_{12}/ER_S < 4.5 \quad (1)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $ER_S$ denotes the maximum radius of an opening of the aperture stop.

Conditional expression (1) is a conditional expression for small-sizing of the optical system, and is an expression that specifies a preferable amount of change in the distance (space) between the first lens unit and the second lens unit.

By making so as not to fall below a lower limit value of conditional expression (1), even in a case of securing the required zooming ratio, such as zooming of 2.8 times or more, it is possible to suppress an increase in the refractive power of each of the first lens unit and the second lens unit. Therefore, it is possible to reduce a fluctuation in the spherical aberration at the time of zooming and a fluctuation in a curvature of field at the time of zooming even while suppressing an increase in the number of lenses, in each of the first lens unit and the second lens unit.

Moreover, since it is possible to suppress the increase in the number of lenses, it is possible to reduce a thickness when collapsed, in a case of using a collapsible type for accommodating the zoom lens. In such manner, by making so as not to fall below the lower limit value of conditional expression (1), it is possible to contribute to small-sizing of the camera as well.

By making so as not to exceed an upper limit value of conditional expression (1), it is possible to let the distance between the first lens unit and the second lens unit not to increase excessively. By making such an arrangement, it is possible to contribute to shortening the overall length of the zoom lens.

Moreover, in the zoom lens according to the present embodiment, it is preferable that the following conditional expression (2) is satisfied.

$$1.05 < |f_3/f_{UN21}| < 2.1 \quad (2)$$

where, $f_3$ denotes a focal length of the third lens unit, and $f_{UN21}$ denotes a focal length of the object-side sub lens unit in the second lens unit.

Conditional expression (2) is an expression which specifies a preferable refractive power of the third lens unit.

By making so as not to fall below a lower limit value of conditional expression (2) or not to exceed an upper limit value of conditional expression (2), it is possible to maintain a favorable balance of symmetry of the refractive power arrangement and a favorable balance of magnitude of the negative refractive power in particular. By making such an arrangement, it is possible to contribute to a favorable correction of the spherical aberration and the curvature of field, and to secure a wide angle of view at the wide angle end, and to secure a stable optical performance throughout the total zoom range.

In the zoom lens according to the present embodiment, it is preferable that the following conditional expression (3) is satisfied.

$$-0.9 < SF_{2N} < 1.5 \quad (3)$$

where, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

By making so as not to fall below a lower limit value of conditional expression (3), it is possible to prevent an edge (peripheral portion) on an object-side surface of the second negative lens from sticking out excessively toward the first negative lens. Accordingly, since it becomes easy to bring the second negative lens closer to the first negative lens, it is possible to make a distance between the first negative lens and the second negative lens small. By making such an arrangement, it is possible to contribute to small-sizing of the first lens unit.

By making so as not to exceed an upper limit value of conditional expression (3), it is made easy to achieve an effect of correcting sufficiently the astigmatism of an object-side surface of the second negative lens.

Moreover, in the zoom lens according to the present embodiment, it is preferable that conditional expression (4) is satisfied.

$$1.2<\Delta D_{12}/IH_{MAX}<1.85 \quad (4)$$

where, $$\Delta D_{12}=D_{12W}-D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, and $IH_{MAX}$ denotes the maximum image height, and denotes the maximum value in a case in which, the maximum image height changes with zooming.

A technical significance of conditional expression (4) is same as a technical significance of conditional expression (1). Therefore, the technical significance of conditional expression (4) is omitted.

Moreover, in the zoom lens according to the present embodiment, it is preferable that either of the following conditional expressions (5) or (5') is satisfied.

$$0.8<|f_3/f_W|<2.5 \quad (5)$$

$$1.1<|f_3/f_W|<1.9 \quad (5')$$

where, $f_3$ denotes a focal length of the third lens unit, and $f_W$ denotes a focal length of the overall zoom lens system at the time of infinite object point focusing at the wide angle end.

A technical significance of conditional expressions (5) and (5') is same as a technical significance of conditional expression (2). Therefore, description of the technical significance of (5) and (5') is omitted.

Moreover, in the zoom lens according to the present embodiment, it is preferable that one of the following conditional expressions (6) or (6') is satisfied.

$$0.43<\Sigma_{2G}/f_2<0.78 \quad (6)$$

$$0.45<\Sigma_{2G}/f_2<0.75 \quad (6')$$

where, $\Sigma_{2G}$ denotes a thickness on an optical axis of the second lens unit, and $f_2$ denotes a focal length of the second lens unit.

By making so as not to fall below a lower limit value of conditional expression (6), it becomes easy to suppress the tendency of the curvature of field becoming excessive. Accordingly, it is made easy to suppress an increase in the curvature of field throughout the total zoom range. Moreover, it becomes easy to secure sufficiently the refractive power of the second lens unit. By making such an arrangement, it is possible to contribute to the shortening of the overall length of the zoom lens.

By making so as not to exceed an upper limit value of conditional expression (6), it is possible to suppress an increase in thickness of the second lens unit. By making such an arrangement, it is possible to contribute to the shortening of the overall length of the zoom lens.

A technical significance of conditional expression (6') is same as a technical significance of conditional expression (6). Therefore, description of the technical significance of conditional expression (6') is omitted.

Moreover, in the zoom lens according to the present embodiment, it is preferable that the following conditional expression (7) is satisfied.

$$0.6<f_{UN21}/f_2<1.8 \quad (7)$$

where, $f_{UN21}$ denotes a focal length of the object-side sub lens unit in the second lens unit, and $f_2$ denotes a focal length of the second lens unit.

By making so as not to fall below a lower limit value of conditional expression (7), it is possible to suppress occurrence of the spherical aberration and the coma in the object-side sub lens unit in the second lens unit. Moreover, even if the spherical aberration and the coma occur, since it is possible to suppress an amount of the spherical aberration and the coma that occurs, it becomes easy to negate the spherical aberration and the coma the image-side sub lens unit. By making such an arrangement, it is possible to contribute to an improvement of the optical performance.

By making so as not to exceed an upper limit value of conditional expression (7), it becomes easy to make the refractive power of the second lens unit large. By making such an arrangement, it is possible to contribute to the shortening of the overall length of the zoom lens.

Moreover, in the zoom lens according to the present embodiment, it is preferable that the following conditional expression (8) is satisfied.

$$1.17<|f_3/f_2|<1.95 \quad (8)$$

where, $f_2$ denotes a focal length of the second lens unit, and $f_3$ denotes a focal length of the third lens unit.

By making so as not to fall below a lower limit value of conditional expression (8), it is possible to make the refractive power of the third lens unit moderately small. By making such an arrangement, it is possible to contribute to the shortening of the overall length of the zoom lens.

By making so as not to exceed an upper limit value of conditional expression (8), it is possible to secure sufficiently a correction of the spherical aberration and the coma that occurs in the third lens unit. Accordingly, it becomes easy to achieve the stable optical performance throughout the total zoom range.

Moreover, in the zoom lens according to the present embodiment, it is preferable that the following conditional expression (9) is satisfied.

$$1.15<f_2/IH_{MAX}<1.5 \quad (9)$$

where, $f_2$ denotes a focal length of the second lens unit, and $IH_{MAX}$ denotes the maximum image height, and denotes the maximum value in a case in which, the maximum image height changes with zooming.

In the second lens unit, the spherical aberration and the coma are susceptible to occur. Therefore, by making so as not to fall below a lower limit value of conditional expression (9), it becomes easy to suppress the spherical aberration and the coma from occurring, with the small number of lenses. By making such an arrangement, it is possible to contribute to small-sizing in an optical direction of the second lens unit.

By making so as not to exceed an upper limit value of conditional expression (9), it is possible to contribute to achieve both of securing the required zooming ratio, such as zooming ratio of 2.8 times or more, and shortening the overall length of the zoom lens.

Moreover, in the zoom lens according to the present embodiment, it is preferable that the following conditional expression (10) is satisfied.

$$1.5 < f_{UN21}/ER_S < 3.9 \tag{10}$$

where, $f_{UN21}$ denotes a focal length of the object-side sub lens unit in the second lens unit, and $ER_S$ denotes the maximum radius of an opening of the aperture stop.

A technical significance of conditional expression (10) is same as a technical significance of conditional expression (7). Therefore, description of the technical significance of conditional expression (10) is omitted.

Moreover, in the zoom lens according to the present embodiment, it is preferable that the following conditional expression (11) is satisfied.

$$3 < LTL_{min}/fb_{LTLmin} < 13 \tag{11}$$

where, $LTL_{min}$ denotes a sum of an overall length of the zoom lens at the time of infinite object point focusing and an air-converted back focus, and is the minimum value thereof in a case in which, the overall length changes with zooming, the overall length is a distance on an optical axis from a refracting surface of the zoom lens nearest to the object side and a refracting surface of the zoom lens nearest to the image side, and $fb_{LTLmin}$ denotes the air-converted back focus at $LTL_{min}$.

For securing the required zooming ratio such as 2.8 times or more, a variable space corresponding to the zooming ratio, or in other words, a space for the lens units to move corresponding to the zooming ratio is necessary. By making so as not to fall below a lower limit value of conditional expression (11), it is made easy to secure the required variable space corresponding to the zooming ratio.

By making so as not to exceed an upper limit value of conditional expression (11), shortening of the overall length of the zoom lens is carried out. Moreover, in a case in which, the zoom lens is used for an interchangeable lens, the required back focus is secured such that there is no interference (collision) with a camera main-body.

The basic arrangement, preferable arrangements, and preferable conditional expressions have been described above. By combining the preferable arrangements and the preferable conditional expressions appropriately with the basic arrangement, it is possible to form the zoom lens according to the present embodiment more specifically. The more specific zoom lens according to the present embodiment is as follows. Since the technical significance of each arrangement and each conditional expression, have already been described, the description thereof is omitted below.

A zoom lens according to a first embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (1) and (2) are satisfied.

$$3.0 < \Delta D_{12}/ER_S < 4.5 \tag{1}$$

$$1.05 < |f_3/f_{UN21}| < 2.1 \tag{2}$$

A zoom lens according to a second embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (1) and (3) are satisfied.

$$3.0 < \Delta D_{12}/ER_S < 4.5 \tag{1}$$

$$-0.9 < SF_{2N} < 1.5 \tag{3}$$

A zoom lens according to a third embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the following conditional expressions (4) and (5') are satisfied.

$$1.2 < \Delta D_{12}/IH_{MAX} < 1.85 \tag{4}$$

$$1.1 < |f_3/f_W| < 1.9 \tag{5'}$$

A zoom lens according to a fourth embodiment of the present invention includes in order from an object side to an image side, a first lens unit having a negative refractive power, a second lens unit having a positive refractive power, and a third lens unit having a negative refractive power, and the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the following conditional expressions (4) and (6) are satisfied.

$$1.2 < \Delta D_{12}/IH_{MAX} < 1.85 \quad (4)$$

$$0.43 < \Sigma_{2G}/f_2 < 0.78 \quad (6)$$

A zoom lens according to a fifth embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (7), (8), and (9) are satisfied.

$$0.6 < f_{UN21}/f_2 < 1.8 \quad (7)$$

$$1.17 < |f_3/f_2| < 1.95 \quad (8)$$

$$1.15 < f_2/IH_{MAX} < 1.5 \quad (9)$$

A zoom lens according to a sixth embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the image-side sub lens unit in the second lens unit includes a lens surface having a negative refractive power and a positive lens which is disposed on the image side of the lens surface, and the following conditional expressions (3), (10), and (11) are satisfied.

$$-0.9 < SF_2N < 1.5 \quad (3)$$

$$1.5 < f_{UN}21/ER_S < 3.9 \quad (10)$$

$$3 < LTL_{min}/fb_{LTLmin} < 13 \quad (11)$$

A zoom lens according to a seventh embodiment of the present invention includes in order from an object side to an image side, a first lens unit having a negative refractive power, a second lens unit having a positive refractive power, and a third lens unit having a negative refractive power, and at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power, and an image-side sub lens unit, and the object-side sub lens unit in the second lens unit includes one lens component, and in the lens component, only two surfaces, namely, an object-side surface and an image-side surface, are in contact with air in an optical path, and the following conditional expressions (2) and (4) are satisfied.

$$1.05 < |f_3/f_{UN21}| < 2.1 \quad (2)$$

$$1.2 < \Delta D_{12}/IH_{MAX} < 1.85 \quad (4)$$

Moreover, for the zoom lenses according to the embodiments from the first embodiment to the seventh embodiment (hereinafter, appropriately called as 'the zoom lens according to the present embodiment'), it is possible to combine the following arrangements and conditional expressions.

In the zoom lens according to the present embodiment, it is preferable that the zoom lens includes a fourth lens unit having a positive refractive power, disposed on the image side of the third lens unit, and at the time of zooming, a distance between the third lens unit and the fourth lens unit changes.

When such an arrangement is made, an optical system in which, the third lens unit having a negative refractive power and the fourth lens unit having a positive refractive power are combined, becomes a magnifying optical system which magnifies an image formed at a lens unit on the object side of the third lens unit. Accordingly, a diameter of the first lens unit is made small. Moreover, it becomes easy to move an exit pupil away from an image pickup surface (image plane). By making such an arrangement, it is possible to contribute to improve a variation in an amount of light at a central area of an image and an amount of light at a peripheral area of the image.

Moreover, in the zoom lens according to the present embodiment, it is preferable to let a lens surface nearest to the object side of the fourth lens unit to be a concave surface directed toward the object side, and to let a lens surface nearest to the image side of the fourth lens unit to be a convex surface directed toward the image side. By making such an arrangement, it is possible to contribute to securing stable optical performance throughout the total zoom range.

In the zoom lens according to the present embodiment, it is preferable that a distance between the third lens unit and the fourth lens unit at the telephoto end is longer than a distance between the third lens unit and the fourth lens unit at the wide angle end.

By making such an arrangement, it is possible to contribute to securing the required zooming ratio.

In the zoom lens according to the present embodiment, it is preferable that the fourth lens unit is stationary at the time of zooming.

By letting the fourth lens unit to be stationary at the time of zooming, it becomes easy to simplify a structure of a drive mechanism. By making such an arrangement, it is possible to contribute to small-sizing of the optical system. Moreover, it is also possible to contribute to noise reduction when the zoom lens is operated.

Moreover, in the zoom lens according to the present invention, it is preferable that the total number of lens units in the zoom lens is four, namely, the first lens unit, the second lens unit, the third lens unit, and the fourth lens unit.

By making the zoom lens a four-unit zoom lens, it becomes easy to simplify an arrangement of a holding member. By making such an arrangement, it is possible to contribute to small-sizing of the optical system.

In the zoom lens according to the present embodiment, it is preferable that the object-side sub lens unit and the image-side sub lens unit in the second lens unit are disposed such that, an axial air space between the object-side sub lens unit and the image-side sub lens unit is the maximum in the second lens unit.

By making such an arrangement, it is possible to contribute to favorable correction of various aberrations occurring in the second lens unit. The image-side sub lens unit may include a plurality of lens components. In this case, the second lens unit is arranged to have a plurality of axial air spaces. Therefore, when the abovementioned arrangement is made, a favorable aberration correction in the second lens unit becomes possible.

Moreover, in the zoom lens according to the embodiment, it is preferable that the image-side sub lens unit in the second lens unit includes one lens component, and in the lens component, only two surfaces, namely, the object-side surface and the image-side surface, are in contact with air in the optical path.

By making such an arrangement, it is possible to contribute to small-sizing of the second lens unit.

In the zoom lens according to the present embodiment, it is preferable that the following conditional expression (5) is satisfied.

$$0.8 < |f_3/f_W| < 2.5 \quad (5)$$

where, $f_3$ denotes a focal length of the third lens unit, and $f_W$ denotes a focal length of the overall zoom lens system at the time of infinite object point focusing at the wide angle end.

The technical significance of conditional expression (5) is as already explained.

Moreover, in the zoom lens according to the present embodiment, it is preferable that the following conditional expression (12) is satisfied.

$$-20.0\% < DT_W < -6.0\% \quad (12)$$

where, $DT_W = \{IH_W - f_W \times \tan(\omega_W)\}/\{f_W \times \tan(\omega_W)\} \times 100(\%)$, $f_W$ denotes a focal length of the overall zoom lens system at the time of infinite object point focusing at the wide angle end, $IH_W$ denotes the maximum image height at the time of infinite object point focusing at the wide angle end, and $\omega_W$ denotes a half angle of view at the time of infinite object point focusing at the wide angle end.

It is preferable to reduce a distortion of image by making so an not to fall below a lower limit value of conditional expression (12). Moreover, by making so as not to fall below the lower limit value of conditional expression (12), even in a case in which, the distortion at the wide angle end has been corrected electrically, it is possible to suppress degradation of resolution at the periphery of an image after correction.

By making so as not to exceed an upper limit value of conditional expression (12), it is possible to contribute to a favorable correction of astigmatism and small-sizing of the first lens unit.

In the zoom lens according to the present embodiment, it is preferable that the second lens unit includes in order from the object side to the image side, the object-side sub lens unit having a positive refractive power and the image-side sub lens unit, and the object-side lens unit in the second lens unit includes one lens component, and in the lens component, only two surfaces, namely, the object-side surface and the image-side surface, are in contact with air in the optical path, and the following conditional expression (13) is satisfied.

$$-1.5 < SF_{UN21} < 0.5 \quad (13)$$

where, $$SF_{UN21} = (R_{UN21O} + R_{UN21I})/(R_{UN21O} - R_{UN21I})$$

$R_{UN21O}$ denotes a paraxial radius of curvature of an object-side surface of the object-side sub lens unit in the second lens unit, and $R_{UN21I}$ denotes a paraxial radius of curvature of an image-side surface of the object-side sub lens unit in the second lens unit.

The spherical aberration and the coma are susceptible to occur at a surface of incidence of the object-side sub lens unit in the second lens unit. Therefore, by making so as not to fall below a lower limit value of conditional expression (13), it is possible to suppress the occurrence of the spherical aberration and the coma. By making such an arrangement, it is possible to contribute to securing a favorable optical performance, particularly near the telephoto end. The favorable optical performance means that the occurrence of various aberrations is suppressed sufficiently.

By making so as not to exceed an upper limit value of conditional expression (13), a principal point of the second lens unit is not drawn excessively toward the image side, thereby making it is easy to secure the required zooming ratio.

Moreover, in the zoom lens according to the present embodiment, it is preferable that the following conditional expression (14) is satisfied.

$$0.38 < \Sigma_{2G}/f_W < 0.75 \quad (14)$$

where, $\Sigma_{2G}$ denotes a thickness of the second lens unit on an optical axis, and $f_W$ denotes a focal length of the overall zoom lens system at the time of infinite object point focusing at the wide angle end.

The curvature of field is reduced by making so as to fall below a lower limit value of conditional expression (14), thereby making it easy to carry out the correction of the curvature of field throughout the total zoom range.

The thickness of the second lens unit is made small by making so as not to exceed an upper limit value of conditional expression (14), thereby making a collapsed thickness is reduced, in a case of using a collapsible type for accommodating the zoom lens. Moreover, by making such an arrangement, small-sizing of camera is carried out.

Moreover, in the zoom lens according to the present embodiment, it is preferable that the second lens unit includes in order from the object side to the image side, the object-side sub lens unit having a positive refractive power and the image-side sub lens unit, and the object-side sub lens unit in the second lens unit includes one lens component, and in the lens component, only two surfaces, namely, the object-side surface and the image-side surface, are in contact with air in the optical path, and the image-side sub lens unit in the second lens unit includes a lens surface having a negative refractive power, and a positive lens which is disposed on the image side of the lens surface.

A technical significance of such arrangement is as already explained.

In the zoom lens according to the present embodiment, it is preferable that the following conditional expression (8) is satisfied.

$$1.17 < |f_3/f_2| < 1.95 \quad (8)$$

where, $f_2$ denotes a focal length of the second lens unit, and $f_3$ denotes a focal length of the third lens unit.

The technical significance of conditional expression (8) is as already explained.

Moreover, in the zoom lens according to the present embodiment, it is preferable that the following conditional expression (15) is satisfied.

$$1.3 < |f_3/IH_{MAX}| < 2.5 \quad (15)$$

where, $f_3$ denotes the focal length of the third lens unit, and $IH_{MAX}$ denotes the maximum image height, and denotes the maximum value in a case in which, the maximum image height changes with zooming.

A technical significance of conditional expression (15) is same as the technical significance of conditional expression (8). Therefore, the explanation of the technical significance of conditional expression (15) is omitted.

In the zoom lens according to the present embodiment, it is preferable that the third lens unit includes a lens having a specific gravity more than 0.9 g/cm³ and less than 1.3 g/cm³.

It is possible to make the involvement of the third lens unit in zooming comparatively smaller. Therefore, it is preferable to carry out reduction of image blur due to focusing and camera shake by using the third lens unit. In focusing, it is preferable to move the third lens unit in an optical axial direction. Moreover, for reducing the image blur, it is preferable to move the third lens unit in a direction orthogonal to the optical axis (shifting movement).

Here, by the third lens unit satisfying the abovementioned condition of specific gravity, it is possible to secure light weight and high rigidity of the third lens unit. By making such an arrangement, a followability of the third lens unit at the time of moving is improved, and accordingly, the reduction of the focusing and image blur is accelerated.

Moreover, in the zoom lens according to the present embodiment, it is preferable that the second lens unit includes a negative lens, and a positive lens that satisfies the following conditional expression (16).

$$63 < \nu_{p1} < 96 \quad (16)$$

where, $\nu_{p1}$ denotes Abbe's number for a d-line of any of the positive lenses in the second lens unit.

Since the second lens unit is close to the aperture stop, an effect on the spherical aberration for each color is large. For correction of a longitudinal chromatic aberration, it is preferable to make a dispersion in a lens having a positive refractive power small, and a dispersion in a lens having a negative refractive power large. However, since the lens with a large dispersion also has a large anomalous dispersibility, in a lens with an excessively large dispersion, it becomes difficult to correct the spherical aberration for each color. Therefore, by satisfying conditional expression (16), it is possible to correct these aberrations favorably.

By making so as not to fall below a lower limit value of conditional expression (16), since the dispersion in the positive lens can be made to be low dispersion, it is possible to suppress an increase in the anomalous dispersibility of the negative lens relatively. By making such an arrangement, it is possible to contribute to favorable correction of chromatic aberration.

By making so as not to exceed an upper limit value of conditional expression (16), since it is possible to impart a dispersion of certain magnitude to the positive lens, it is possible to reduce the abnormal dispersibility of the positive lens. By making such an arrangement, it is possible to contribute to favorable correction of the chromatic aberration.

Moreover, in the zoom lens according to the present embodiment, it is preferable that the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens.

A technical significance of such arrangement is as already explained.

Moreover, in the zoom lens according to the present embodiment, it is preferable that the following conditional expression (3) is satisfied.

$$-0.9 < SF_{2N} < 1.5 \quad (3)$$

where, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

A technical significance of conditional expression (3) is as already explained.

Moreover, in the zoom lens according to the present embodiment, it is preferable that the following conditional expression (17) is satisfied.

$$0.6 < fb_W/IH_{MAX} < 1.8 \quad (17)$$

where, $fb_W$ denotes an air-converted back-focus at the time of infinite object point focusing at the wide angle end, and $IH_{MAX}$ denotes the maximum image height, and denotes the maximum value in a case in which, the maximum image height changes with zooming.

The overall zoom lens is drawn away from an image plane by making so an not to fall below a lower limit value of conditional expression (17), thereby making it becomes easy to draw the exit pupil away from the image plane. Accordingly, since it becomes possible to make an angle of incidence of a light ray incident on the image plane small, it is possible to improve a variation in an amount of light at a central area of an image and an amount of light at a peripheral area of the image.

By making so as not to exceed an upper limit value of conditional expression (17), it is possible to contribute to shortening the overall length of the zoom lens and securing a wide angle of view at the wide angle end.

In the zoom lens according to the present embodiment, it is preferable that the following conditional expression (18) is satisfied.

$$0.4 < f_1/f_3 < 1.2 \qquad (18)$$

where, $f_1$ denotes a focal length of the first lens unit, and
$f_3$ denotes a focal length of the third lens unit.

An increase in the negative refractive power of the first lens unit is suppressed by making so as not to fall below a lower limit value of conditional expression (18), thereby making an arrangement such that no large negative distortion occurs even when small-sizing of the optical system is carried out.

An increase in the negative refractive power of the third lens unit is suppressed by making so as not to exceed an upper limit value of conditional expression (18), thereby making an arrangement such that no large positive distortion occurs even when small-sizing of the optical system is carried out. Moreover, it becomes easy to reduce an occurrence of a chromatic aberration of magnification due to the third lens unit. By making such an arrangement, it is possible to contribute to reduction in the number of lenses in the third lens unit and small-sizing of the optical system.

In the zoom lens according to the present embodiment, it is preferable that the following conditional expression (6') is satisfied.

$$0.45 < \Sigma_{2G}/f_2 < 0.75 \qquad (6')$$

where, $\Sigma_{2G}$ denotes a thickness on an optical axis of the second lens unit, and
$f_2$ denotes a focal length of the second lens unit.

A technical significance of conditional expression (6') is same as the technical significance of conditional expression (6). Therefore, explanation of the technical significance of conditional expression (6') is omitted.

In the zoom lens according to the present embodiment, it is preferable that the following conditional expression (7) is satisfied.

$$0.6 < f_{UN21}/f_2 < 1.8 \qquad (7)$$

where, $f_{UN21}$ denotes a focal length of the object-side sub lens unit in the second lens unit,
$f_2$ denotes a focal length of the second lens unit.

The technical significance of conditional expression (7) is as already explained.

Moreover, in the zoom lens according to the present embodiment, it is preferable that the following conditional expression (19) is satisfied.

$$3 < LTL_W/fb_W < 13 \qquad (19)$$

where, $LTL_W$ denotes a sum of an overall length of the zoom lens at the time of infinite object point focusing at the wide angle end and an air-converted back focus, the overall length is a distance on an optical axis from a refracting surface of the zoom lens nearest to the object side and a refracting surface of the zoom lens nearest to the image side, and $fb_W$ denotes the air-converted back focus at $LTL_W$.

A technical significance of conditional expression (19) is same as the technical significance of conditional expression (11). Therefore, explanation of the technical significance of conditional expression (19) is omitted.

In the zoom lens according to the present embodiment, it is preferable that the following conditional expression (20) is satisfied.

$$0.6 < f_{UN21}/f_W < 1.9 \qquad (20)$$

where, $f_{UN21}$ denotes a focal length of the object-side sub lens unit in the second lens unit, and $f_W$ denotes a focal length of the overall zoom lens system at the time of infinite object point focusing at the wide angle end.

A technical significance of conditional expression (20) is same as the technical significance of conditional expression (10). Therefore, explanation of the technical significance of conditional expression (20) is omitted.

Moreover, in the zoom lens according to the present embodiment, it is preferable that the following conditional expression (20') is satisfied.

$$0.6 < f_{UN21}/f_W < 1.6 \qquad (20')$$

where, $f_{UN21}$ denotes a focal length of the object-side sub lens unit in the second lens unit, and $f_W$ denotes a focal length of the overall zoom lens system at the time of infinite object point focusing at the wide angle end.

A technical significance of conditional expression (20') is same as the technical significance of conditional expression (20). Therefore, explanation of the technical significance of conditional expression (20') is omitted.

In the zoom lens according to the present embodiment, it is preferable that the following conditional expression (21) is satisfied.

$$0.35 < \Delta D_{12}/f_T < 0.6 \qquad (21)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, and $f_T$ denotes a focal length of the overall zoom lens system at the time of infinite object point focusing at the telephoto end.

A technical significance of conditional expression (21) is same as the technical significance of conditional expression (1). Therefore, explanation of the technical significance of conditional expression (21) is omitted.

Moreover, in the zoom lens according to the present embodiment, it is preferable that the following conditional expression (22) is satisfied.

$$0.35 < |f_3/ER_S| < 1.05 \qquad (22)$$

where, $f_3$ denotes the focal length of the third lens unit, and

ER$_S$ denotes the maximum radius of an opening of the aperture stop.

A technical significance of conditional expression (22) is same as the technical significance of conditional expression (3). Therefore, explanation of the technical significance of conditional expression (22) is omitted.

Moreover, in the zoom lens according to the present embodiment, it is preferable that the first lens unit includes a plastic aspherical lens which satisfies the following conditional expression (23).

$$0.0001 < |ASP_O - ASP_I|/IH_{33W} < 0.02 \quad (23)$$

where,

IH$_{33W}$ denotes a distance from an optical axis of a position at which, a principal ray intersects with a paraxial image plane such that, an incidence-side half angle of view of the zoom lens at the time of infinite object point focusing at the wide angle end becomes 33°.

ASP$_O$ denotes an amount of aspherical deviation at a position at which, a distance of an object-side surface of the plastic aspherical lens from the optical axis becomes IH$_{33W}$, ASP$_I$ denotes an amount of aspherical deviation at a position at which, a distance of an image-side surface of the plastic aspherical lens from the optical axis becomes IH$_{33W}$, and the amount of aspherical deviation is a distance along an optical axial direction, from a reference spherical surface for which, a vertex of a surface intended is let to be the vertex, and a radius of curvature is let to be same as a paraxial radius of curvature of the surface intended, up to the surface intended, and a case in which, the intended surface is on the image side with respect to the reference spherical surface is let to have a positive sign.

The first lens unit, in particular, contributes to a favorable correction of the curvature of field near the wide angle end. Therefore, the effect of correction of the curvature of field is improved further by using the aspherical lens in the first lens unit. Moreover, a size in a radial direction of the first lens unit is larger as compared to a size of other lens units. Therefore, by using the plastic aspherical lens in the first lens unit, an increase in a lens-cost is also suppressed while achieving an effect of the aspheric surface.

However, since a change in a surface shape according to temperature is more for the plastic lens than for a glass, the curvature of field due to a change in temperature occurs. Therefore, while achieving the effect of the aspheric surface by making so as not to fall below a lower limit value of conditional expression (23), and a fluctuation in aberration due to the change in temperature is suppressed by making so as not to exceed an upper limit value of conditional expression (23).

Figure 11:
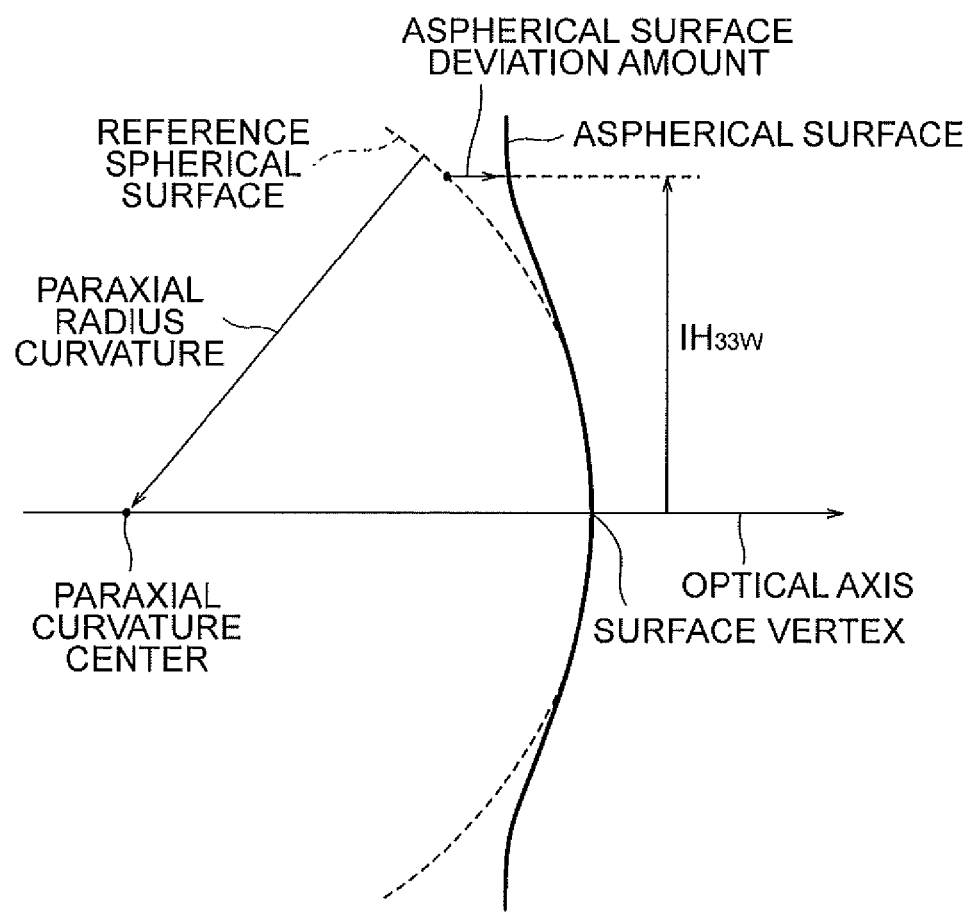
FIG. 11 is a cross-sectional view showing an amount of aspherical deviation of an aspherical lens.

The amount of aspherical deviation, as shown in FIG. 11, is a distance from a reference spherical surface up to an aspheric surface, measured in a direction parallel to the optical axis, when a spherical surface having a vertex same as a vertex of an aspheric surface, and for which, a radius of curvature is let to be same as the paraxial radius of curvature of the aspheric surface, and a direction toward the image (rightward direction in the diagram) is let to have a positive sign.

It is preferable that a coefficient of thermal expansion α of a plastic material to be used for the plastic lens satisfies the following conditional expression.

$$2e^{-5} \, \mu m/° \, C. < \alpha < 8e^{-5} \, \mu m/° \, C.$$

Here, the coefficient of thermal expansion α means that when there is a rise in temperature by 1° C. per 1 m, the dimension changes by α μm.

By satisfying the abovementioned conditional expression, it becomes easy to facilitate achieving both of ease of molding the lens and suppressing the fluctuation in aberration due to the change in temperature.

Moreover, in the zoom lens according to the present embodiment, it is preferable that both the object-side surface and the image-side surface of the plastic aspherical lens are aspheric surfaces.

By making such an arrangement, the function of correction of aberration by the aspheric surface is all the more improved.

Moreover, in the zoom lens according to the present embodiment, it is preferable that at the wide angle end, a light ray of the half angle of view 33° or more is capable of passing through the zoom lens, and the following conditional expression (24) is satisfied.

$$2.6 < f_T/f_W < 5.0 \quad (24)$$

where, f$_T$ denotes a focal length of the overall zoom lens system at the time of infinite object point focusing at the telephoto end, and f$_W$ denotes a focal length of the overall zoom lens system at the time of infinite object point focusing at the wide angle end.

An appropriate zooming ratio is secured by making so as not to fall below a lower limit value of conditional expression (24), thereby making selection of an appropriate angle of view according to various photography scenes is made possible.

By making so as not to exceed an upper limit value of conditional expression (24), it is possible to contribute to both of shortening the overall length of the zoom lens and securing favorable optical performance.

In the zoom lens according to the present embodiment, it is preferable that the second lens unit includes a single lens having a positive refractive power which is disposed nearest to the object side in the second lens unit, and a cemented lens of a negative lens and a positive lens in order from the object side, and the aperture stop is positioned between the single lens and the cemented lens in the second lens unit.

By making such an arrangement, with a small number of lenses, the refractive power of the second lens unit is secured appropriately, and a favorable function of correcting aberration is secured as well. Moreover, since it is possible to dispose the aperture stop near a center of the second lens unit, by making such an arrangement, it is possible to contribute to securing symmetry of refractive power arrangement with respect to the aperture stop, an in particular, symmetry of magnitude of the negative refractive power, as well as to contribute all the more to securing favorable optical performance and small-sizing of the optical system.

At the time of zooming from the wide angle end to the telephoto end, the distances between the lens units change. Here, it is preferable to let the movement of each lens unit as follows at the time of zooming from the wide angle end to the telephoto end. It is preferable that the first lens unit, after moving toward the image side, moves toward the object side. It is preferable that the second lens unit G2 moves toward the object side. It is preferable that the third lens unit G3 moves toward the object side. Moreover, in a case in which, there is a lens unit on the image side of the third lens unit, it is preferable that the lens unit on the image side of the third lens unit is fixed (is stationary). Moreover, it is preferable that the aperture stop (stop) moves toward the object side together with the second lens unit G2.

Moreover, an image pickup apparatus according to the present embodiment includes a zoom lens, and an image pickup element which has an image pickup surface, and which converts an image formed on the image pickup surface by the zoom lens to an electric signal, and the zoom lens is the aforementioned zoom lens.

By making such an arrangement, it is possible to provide an image pickup apparatus which includes a zoom lens in which, both favorable correction of various aberrations and small-sizing of the optical system are achieved.

In a case in which, the zoom lens has a focusing function, the abovementioned arrangements will be let to be arrangements in a state of being focused at an infinite object point.

It is preferable that a plurality of the abovementioned arrangements is simultaneously satisfied interactively. Moreover, an arrangement may be made such that some of the arrangements are satisfied simultaneously. For instance, an arrangement may be made such that one of the abovementioned zoom lenses is used in one of the aforementioned zoom lenses or the image pickup apparatus.

Moreover, regarding the conditional expressions, an arrangement may be made such that each conditional expression is satisfied separately. When such an arrangement is made, it becomes easy to achieve the respective effect, and therefore it is preferable.

For each conditional expression, the upper limit value or the lower limit value may be changed as follows. When the values are changed as given below, the effect of each conditional expression is all the more assured, and therefore it is preferable.

For conditional expression (1), it is more preferable to let the lower limit value to be 3.3, and 3.6 is even more preferable.

Moreover, for conditional expression (1), it is more preferable to let the upper limit value to be 4.3, and 4.2 is even more preferable.

For conditional expression (2), it is more preferable to let the lower limit value to be 1.2, and 1.3 is even more preferable.

Moreover, for conditional expression (2), it is more preferable to let the upper limit value to be 1.9, and 1.8 is even more preferable.

For conditional expression (3), it is more preferable to let the lower limit value to be −0.5, and 0 is even more preferable.

Moreover, for conditional expression (3), it is more preferable to let the upper limit value to be 1.3, and 0.6 is even more preferable.

For conditional expression (4), it is more preferable to let the lower limit value to be 1.35, and 1.5 is even more preferable.

Moreover, for conditional expression (4), it is more preferable to let the upper limit value to be 1.75, and 1.7 is even more preferable.

For conditional expression (5), it is more preferable to let the lower limit value to be 1.1, and 1.2 is even more preferable.

Moreover, for conditional expression (5), it is more preferable to let the upper limit value to be 1.9, and 1.8 is even more preferable.

For conditional expression (5'), it is more preferable to let the lower limit value to be 1.2.

Moreover, for conditional expression (5'), it is more preferable to let the upper limit value to be 1.8.

For conditional expression (6), it is more preferable to let the lower limit value to be 0.45, and 0.5 is even more preferable.

Moreover, for conditional expression (6), it is more preferable to let the upper limit value to be 0.75, and 0.7 is even more preferable.

For conditional expression (6'), it is more preferable to let the lower limit value to be 0.5.

Moreover, for conditional expression (6'), it is more preferable to let the upper limit value to be 0.7.

For conditional expression (7), it is more preferable to let the lower limit value to be 0.8, and 0.85 is even more preferable.

Moreover, for conditional expression (7), it is more preferable to let the upper limit value to be 1.6, and 1.4 is even more preferable.

For conditional expression (8), it is more preferable to let the lower limit value to be 1.25, and 1.3 is even more preferable.

Moreover, for conditional expression (8), it is more preferable to let the upper limit value to be 1.8, and 1.75 is even more preferable.

For conditional expression (9), it is more preferable to let the lower limit value to be 1.18, and 1.20 is even more preferable.

Moreover, for conditional expression (9), it is more preferable to let the upper limit value to be 1.40, and 1.35 is even more preferable.

For conditional expression (10), it is more preferable to let the lower limit value to be 1.8 or 2.0, and 2.5 is even more preferable.

Moreover, for conditional expression (10), it is more preferable to let the upper limit value to be 3.85, and 3.5 is even more preferable.

For conditional expression (11), it is more preferable to let the lower limit value to be 3.5, and 3.9 is even more preferable.

Moreover, for conditional expression (11), it is more preferable to let the upper limit value to be 8, and 4.5 is even more preferable.

For conditional expression (12), it is more preferable to let the lower limit value to be −17.0%, and −15.0% is even more preferable.

Moreover, for conditional expression (12), it is more preferable to let the upper limit value to be −8.0%, and −10.0% is even more preferable.

For conditional expression (13), it is more preferable to let the lower limit value to be −1.3, and −1.35 is even more preferable.

Moreover, for conditional expression (13), it is more preferable to let the upper limit value to be −0.1, and −0.5 is even more preferable.

For conditional expression (14), it is more preferable to let the lower limit value to be 0.45, and 0.54 is even more preferable.

Moreover, for conditional expression (14), it is more preferable to let the upper limit value to be 0.72, and 0.7 is even more preferable.

For conditional expression (15), it is more preferable to let the lower limit value to be 1.5, and 1.6 is even more preferable.

Moreover, for conditional expression (15), it is more preferable to let the upper limit value to be 2.45 or 2.4, and 2.3 is even more preferable.

For conditional expression (16), it is more preferable to let the lower limit value to be 65, and 67 is even more preferable.

Moreover, for conditional expression (16), it is more preferable to let the upper limit value to be 85, and 82 is even more preferable.

For conditional expression (17), it is more preferable to let the lower limit value to be 0.9, and 1.25 is even more preferable.

Moreover, for conditional expression (17) it is more preferable to let the upper limit value to be 1.6, and 1.4 is even more preferable.

For conditional expression (18), it is more preferable to let the lower limit value to be 0.6, and 0.7 is even more preferable.

Moreover, for conditional expression (18), it is more preferable to let the upper limit value to be 1.1, and 1.05 is even more preferable.

For conditional expression (19), it is more preferable to let the lower limit value to be 3.5, and 4.1 is even more preferable.

Moreover, for conditional expression (19), it is more preferable to let the upper limit value to be 9 or 7, and 5 is even more preferable.

For conditional expression (20), it is more preferable to let the lower limit value to be 0.7, and 0.8 is even more preferable.

Moreover, for conditional expression (20), it is more preferable to let the upper limit value to be 1.6 or 1.5, and 1.3 is even more preferable.

For conditional expression (20'), it is more preferable to let the lower limit value to be 0.7, and 0.8 is even more preferable.

Moreover, for conditional expression (20'), it is more preferable to let the upper limit value to be 1.5, and 1.3 is even more preferable.

For conditional expression (21), it is more preferable to let the lower limit value to be 0.4, and 0.41 is even more preferable. Moreover, for conditional expression (21), it is more preferable to let the upper limit value to be 0.55, and 0.46 is even more preferable.

For conditional expression (22), it is more preferable to let the lower limit value to be 0.40, and 0.45 is even more preferable.

Moreover, for conditional expression (22), it is more preferable to let the upper limit value to be 0.95, and 0.85 is even more preferable.

For conditional expression (23), it is more preferable to let the lower limit value to be 0.0003, and 0.0005 is even more preferable.

Moreover, for conditional expression (23), it is more preferable to let the upper limit value to be 0.015, and 0.01 is even more preferable.

For conditional expression (24), it is more preferable to let the lower limit value to be 2.7, and 2.8 is even more preferable.

Moreover, for conditional expression (24), it is more preferable to let the upper limit value to be 4.0, and 3.5 is even more preferable.

Figure 12:
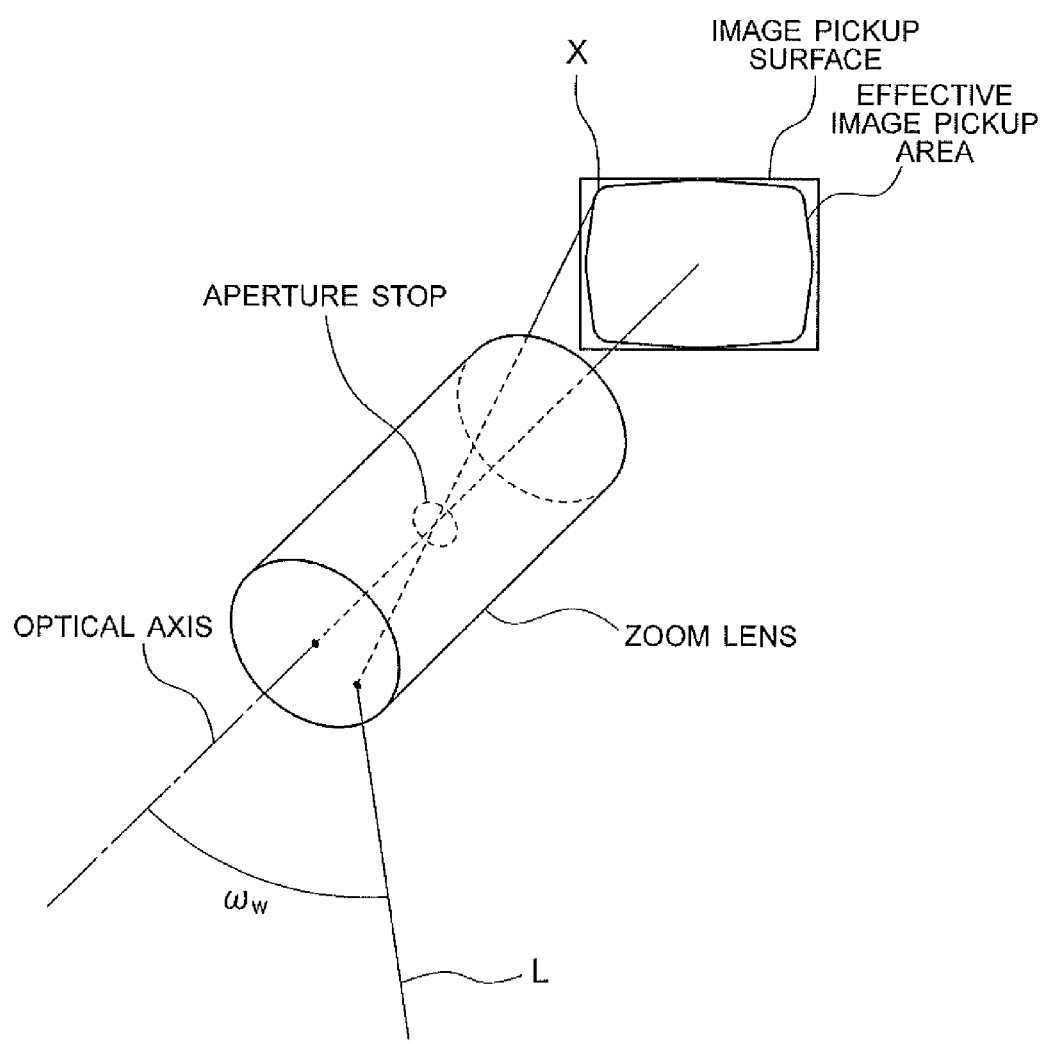
FIG. 12 is a diagram for explaining $\omega_W$.

$\omega_W$ (the maximum half angle of view when focused to an object at infinity at the wide angle end) will be described by using FIG. 12. In FIG. 12, as to how, a zoom lens, an aperture stop, and an image pickup surface are arranged on an optical axis is shown. A light ray which is incident on the zoom lens, upon passing through the aperture stop, is emerged from the zoom lens, and reaches the image pickup surface.

In FIG. 12, a light ray L shown by a solid line indicates a light ray which reaches a point X on an effective image pickup area, from among light rays which pass through the center of the aperture stop. The point X is a position farthest from the optical axis in the effective image pickup area. Here, the effective image pickup area being an area, in which an object image is formed, the point X becomes the maximum image-height position. In such manner, the light ray L is a light ray which passes through the aperture stop, and which is incident on the maximum image-height position. Moreover, $\omega_W$ is a half angle of view with respect to an optical axis of light ray L, at the wide angle end.

Examples of the zoom lens used in the image pickup apparatus according to the present invention will be described below in detail by referring to the accompanying diagrams. However, the present invention is not restricted to the examples described below.

Examples from an example 1 to an example 5 of the zoom lens will be described below. Lens cross-sectional views of the examples from the example 1 to the example 5 are shown in diagrams from FIG. 1A, FIG. 1B, and FIG. 1C to FIG. 5A, FIG. 5B, and FIG. 5C. In these diagrams, FIG. 1A, FIG. 2A, FIG. 3A, FIG. 4A, and FIG. 5A are cross-sectional views at a wide angle end, FIG. 1B, FIG. 2B, FIG. 3B, FIG. 4B, and FIG. 5B, are cross-sectional views in an intermediate focal length state, and FIG. 1C, FIG. 2C, FIG. 3C, FIG. 4C, and FIG. 5C are cross-sectional views at a telephoto end. Each of FIG. 1A, FIG. 1B, and FIG. 1C to FIG. 5A, FIG. 5B, and FIG. 5C is a lens cross-sectional view when focused at an infinite object point.

Moreover, a first lens unit is denoted by G1, a second lens unit is denoted by G2, a third lens unit is denoted by G3, a fourth lens unit is denoted by G4, an aperture stop is denoted by S, a flare aperture is denoted by SF, and an image plane (image pickup surface) is denoted by I. Although it is not shown in the diagram, a flat and parallel plate which forms a low-pass filter and a cover glass of an electronic image pickup element may be disposed between the third lens unit G3 and the image plane I. A wavelength region restricting coating which restricts infrared light may be applied to a surface of the flat and parallel plate. Moreover, a multilayer film for restricting wavelength region may be applied to a surface of the cover glass. The cover glass C may be imparted an effect of a low-pass filter.

In the examples form the example 1 to the example 5, an image height is same at the wide angle end, in the intermediate focal length state, and at the telephoto end. However, the image height at the wide angle end may be let to be small. This is because, letting the image at the wide angle end to be barrel-shaped, it is possible to correct distortion by converting the barrel-shaped image to a rectangular image electrically. Details of correcting the distortion electrically are omitted.

Figure 1B:
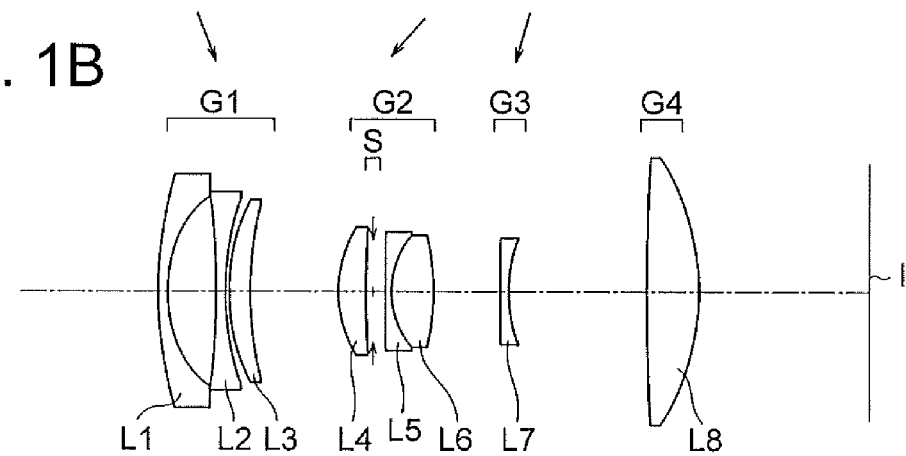
Figure 1C:
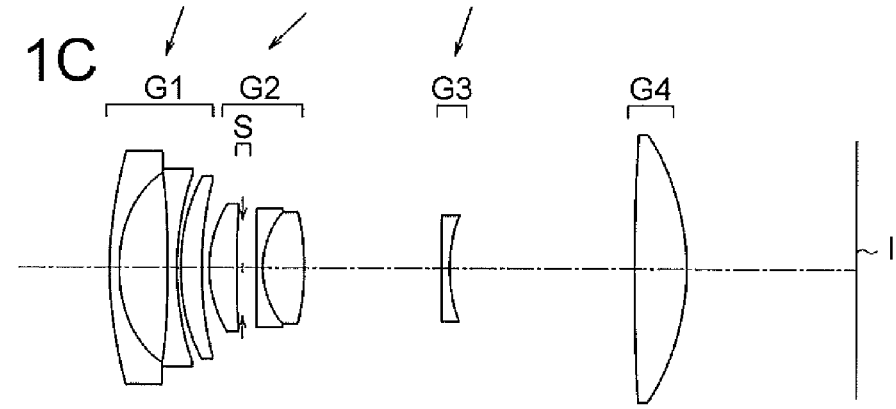

The zoom lens according to the example 1, as shown in FIG. 1A, FIG. 1B, and FIG. 1C, includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop (stop) S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7. A cyclo-olefin polymer (specific gravity: 1.019 g/cm$^3$) is used for the biconcave negative lens L7.

The fourth lens unit G4 includes a biconvex positive lens L8.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of seven surfaces namely, both surfaces of the positive meniscus lens L4, an image-side surface of the biconvex positive lens L6, both surfaces of the biconcave negative lens L7, and both surfaces of the biconvex positive lens L8.

The zoom lens according to the example 2, as shown in FIG. 2A, FIG. 2B, and FIG. 2C, includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop (stop) S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a positive meniscus lens L4 having a convex surface directed toward the object side, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7. A cyclo-olefin polymer (specific gravity: 1.019 g/cm$^3$) is used for the biconcave negative lens L7.

The fourth lens unit G4 includes a positive meniscus lens L8 having a convex surface directed toward an image side.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

At the time of focusing, the third lens unit G3 moves along an optical axis.

An aspheric surface is provided to a total of nine surfaces namely, both surfaces of the positive meniscus lens L3, both surfaces of the positive meniscus lens L4, an image-side surface of the biconvex positive lens L6, both surfaces of the biconcave negative lens L7, and both surfaces of the positive meniscus lens L8.

Figure 3A:
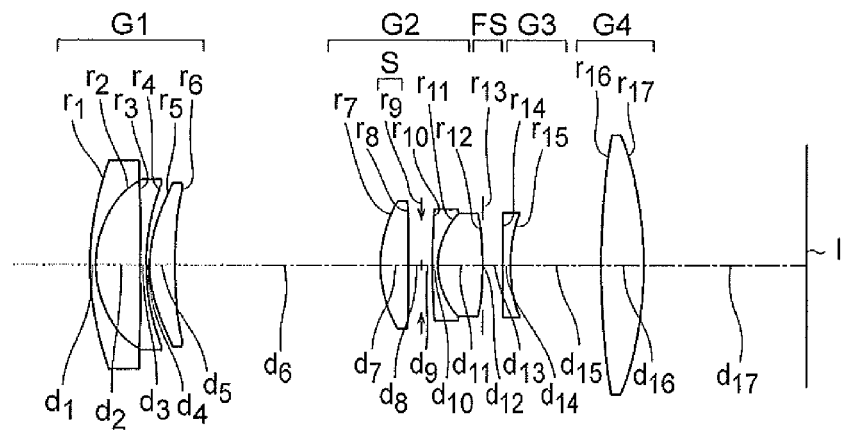
FIG. 3A, FIG. 3B, and FIG. 3C are lens cross-sectional views at the time of infinite object point focusing of a zoom lens according to an example 3 of the present invention, where.
Figure 3B:
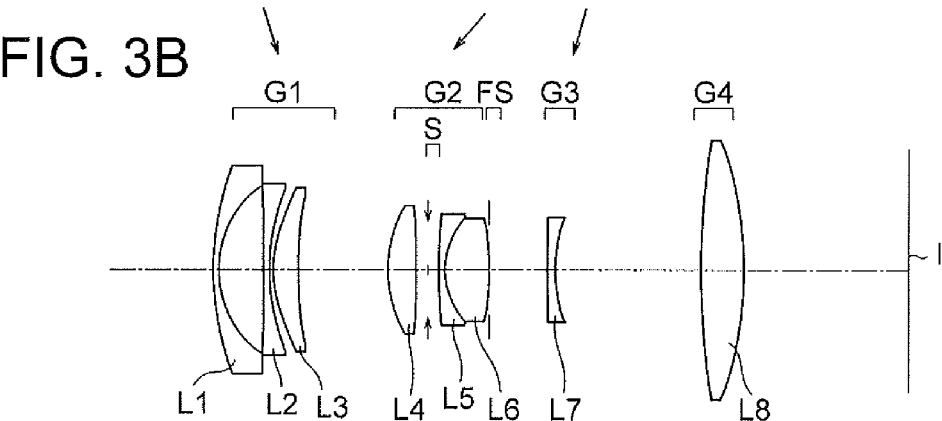
Figure 3C:
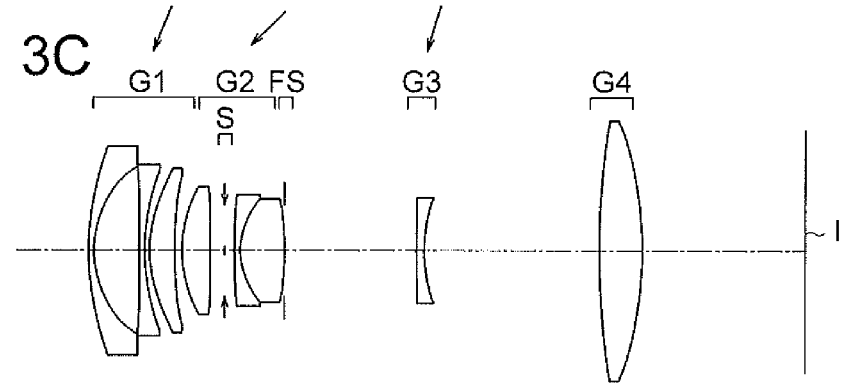

The zoom lens according to the example 3, as shown in FIG. 3A, FIG. 3B, and FIG. 3C, includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop (stop) is disposed in the second lens unit G2. Moreover, a flair aperture SF is disposed nearest to an image side of the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a biconcave negative lens L7. A cyclo-olefin polymer (specific gravity: 1.019 g/cm$^3$) is used for the biconcave negative lens L7.

The fourth lens unit G4 includes a biconvex positive lens L8.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop (stop) S moves toward the object side together with the second lens unit G2.

At the time of focusing, the third lens unit G3 moves along an optical axis.

An aspheric surface is provided to a total of eight surfaces namely, both surfaces of the biconcave negative lens L2, both surfaces of the positive meniscus lens L3, both surfaces of the biconvex positive lens L4, and both surfaces of the biconcave negative lens L7.

Figure 4A:
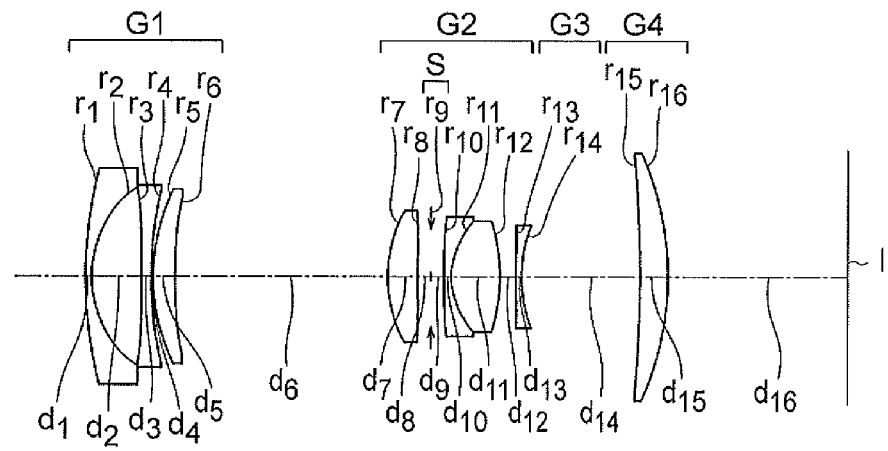
FIG. 4A, FIG. 4B, and FIG. 4C are lens cross-sectional views at the time of infinite object point focusing of a zoom lens according to an example 4 of the present invention, where.
Figure 4B:
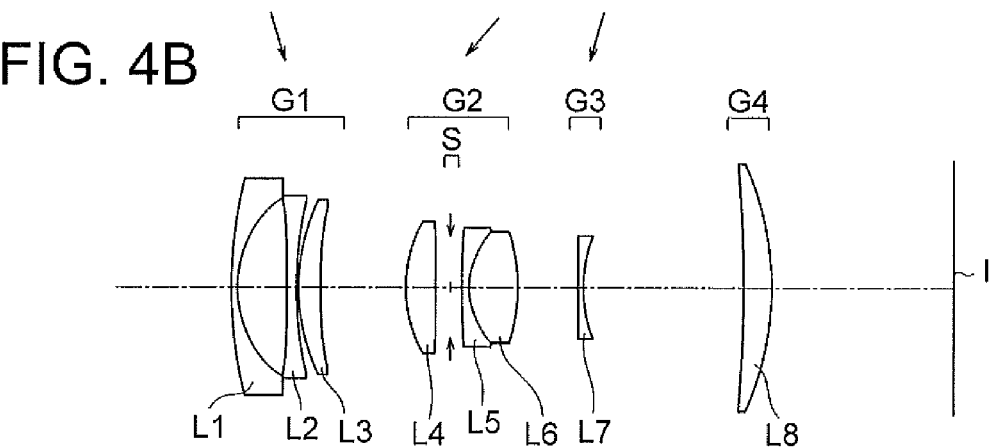
Figure 4C:
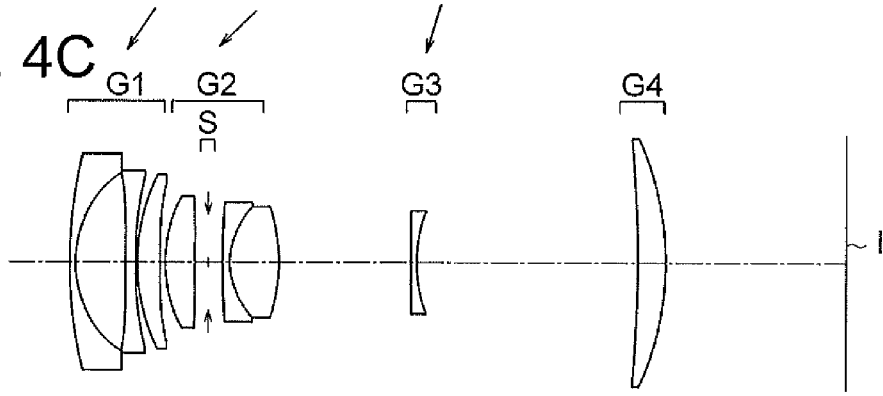

The zoom lens according to the example 4, as shown in FIG. 4A, FIG. 4B, and FIG. 4C, includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop (stop) S is disposed in the second lens unit G2.

The first lens unit G1 includes a negative meniscus lens L1 having a convex surface directed toward the object side, a biconcave negative lens L2, and a positive meniscus lens L3 having a convex surface directed toward the object side.

The second lens unit G2 includes a biconvex positive lens L4, a negative meniscus lens L5 having a convex surface directed toward the object side, and a biconvex positive lens L6. Here, the negative meniscus lens L5 and the biconvex positive lens L6 are cemented.

The third lens unit G3 includes a negative meniscus lens L7 having a convex surface directed toward the object side. A cyclo-olefin polymer (specific gravity: 1.019 g/cm$^3$) is used for the negative meniscus lens L7.

The fourth lens unit G4 includes a positive meniscus lens L8 having a convex surface directed toward an image side.

At the time of zooming from a wide angle end to a telephoto end, the first lens unit G1, after moving toward the image side, moves toward the object side. The second lens unit G2 moves toward the object side. The third lens unit G3 moves toward the object side. The fourth lens unit G4 is fixed (is stationary). The aperture stop (stop) S moves toward the object side together with the second lens unit G2.

At the time of focusing, the third lens unit G3 moves along an optical axis.

An aspheric surface is provided to a total of six surfaces namely, both surfaces of the biconcave negative lens L2, both surfaces of the biconvex positive lens L4, and both surfaces of the negative meniscus lens L7.

Figure 5A:
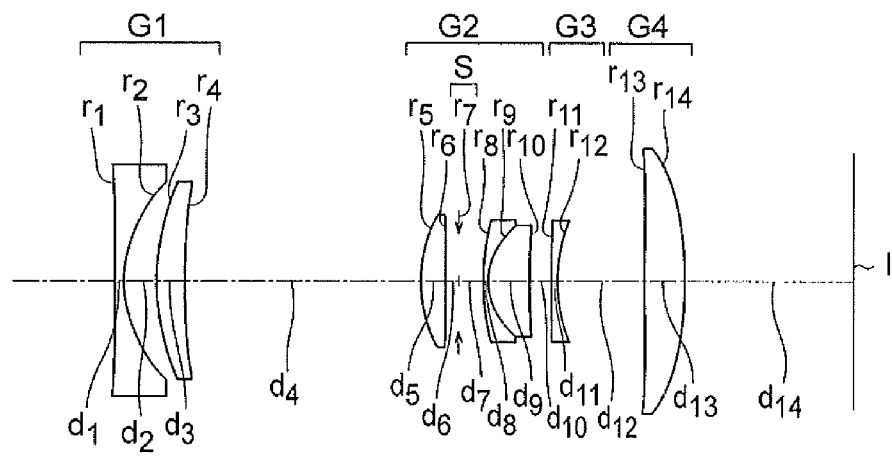
FIG. 5A, FIG. 5B, and FIG. 5C are lens cross-sectional views at the time of infinite object point focusing of a zoom lens according to an example 5 of the present invention, where.
Figure 5B:
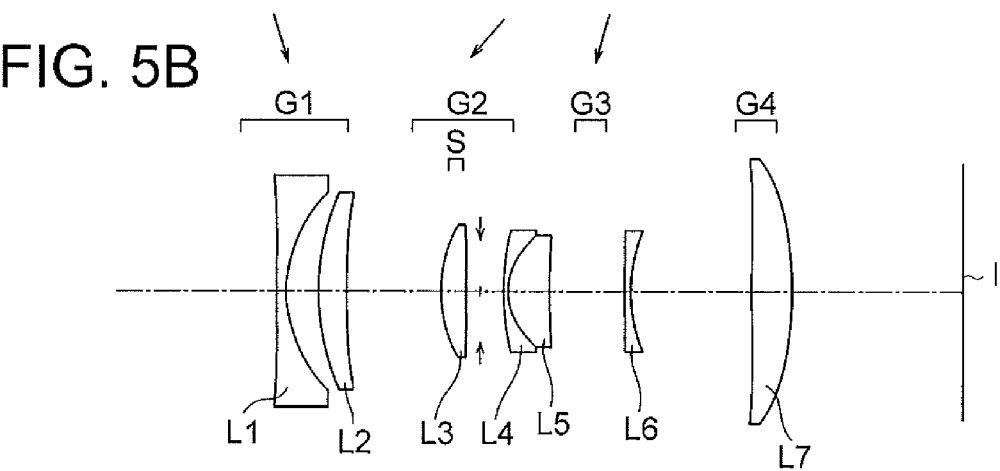
Figure 5C:
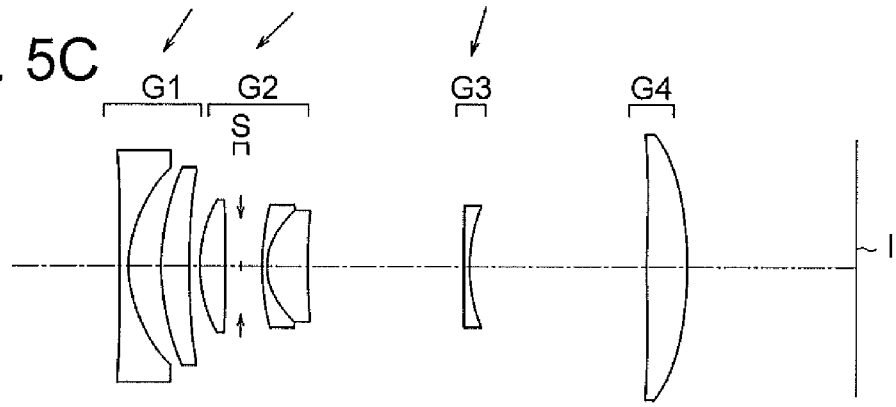
Figure 6A:
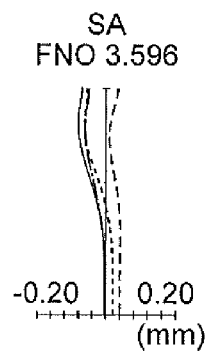
FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the zoom lens according to the example 1.
Figure 6B:
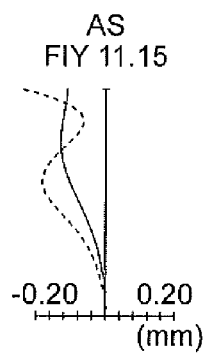
Figure 6C:
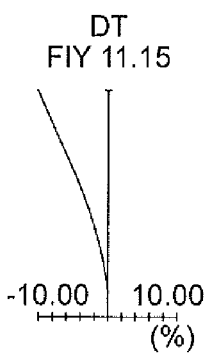
Figure 6D:
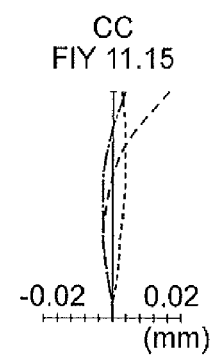
Figure 6E:
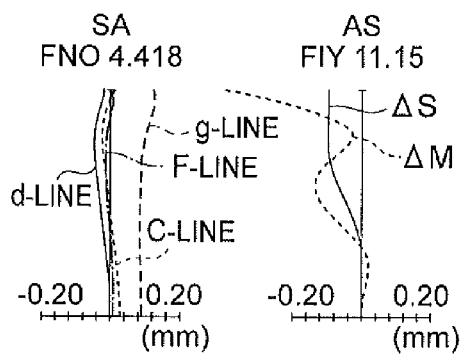
Figure 6F:
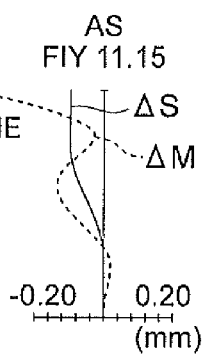
Figure 6G:
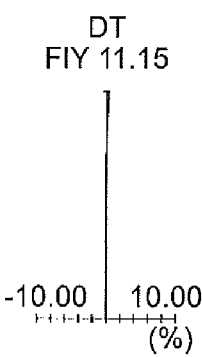
Figure 6H:
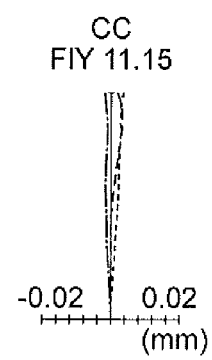
Figure 6I:
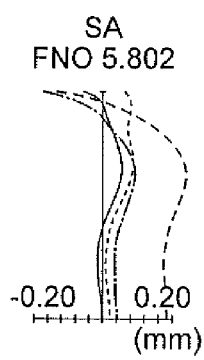
Figure 6J:
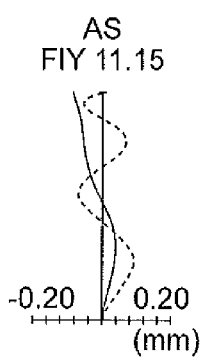
Figure 6K:
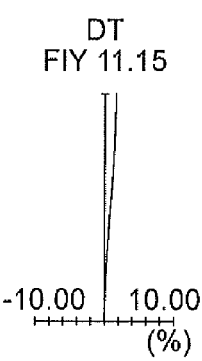
Figure 6L:
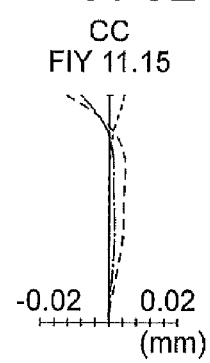
Figure 7A:
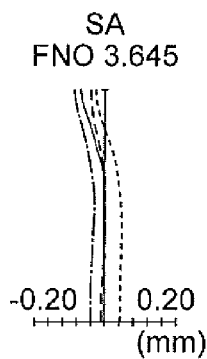
FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of infinite object point focusing of the zoom lens according to the example 2.
Figure 7B:
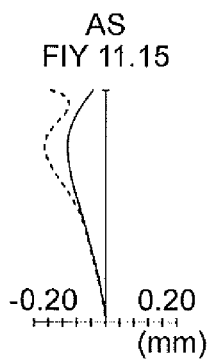
Figure 7C:
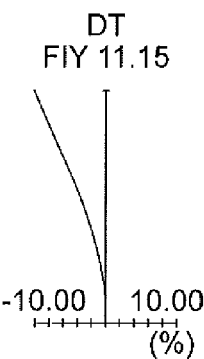
Figure 7D:
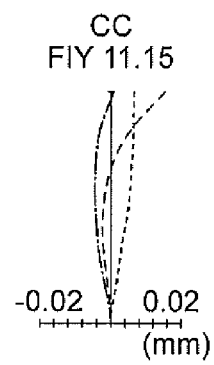
Figure 7E:
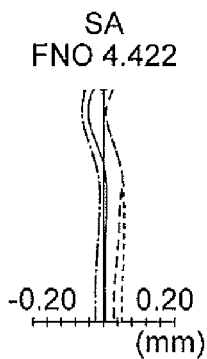
Figure 7F:
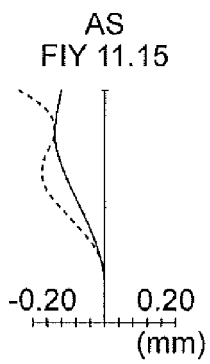
Figure 7G:
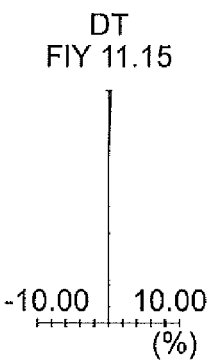
Figure 7H:
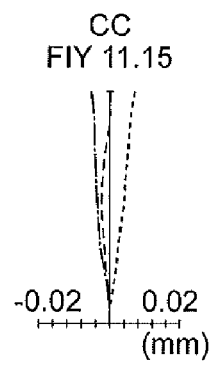
Figure 7I:
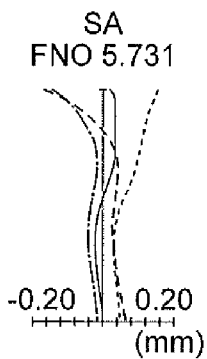
Figure 7J:
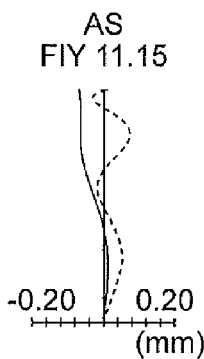
Figure 7K:
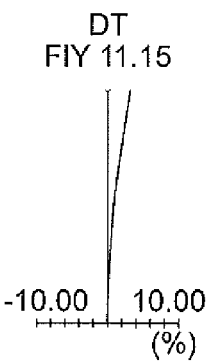
Figure 7L:
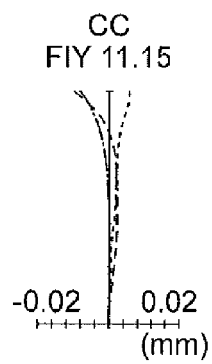
Figure 8A:
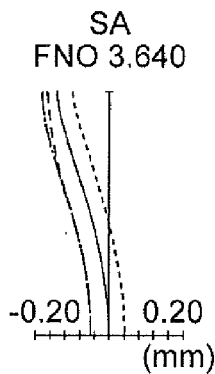
FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens according to the example 3.
Figure 8B:
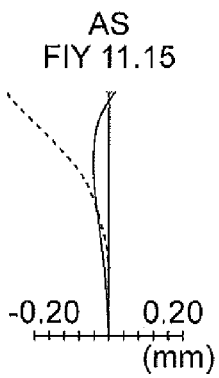
Figure 8C:
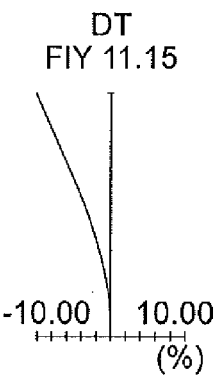
Figure 8D:
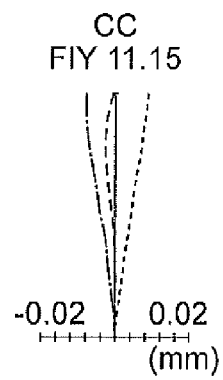
Figure 8E:
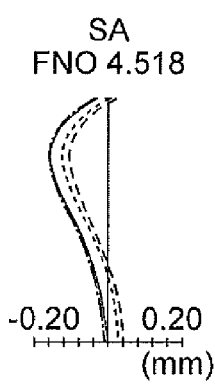
Figure 8F:
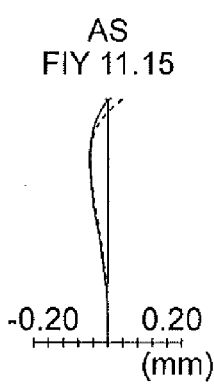
Figure 8G:
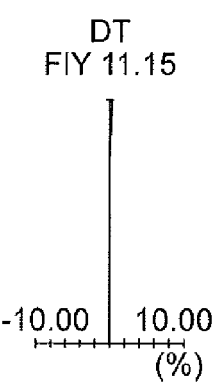
Figure 8H:
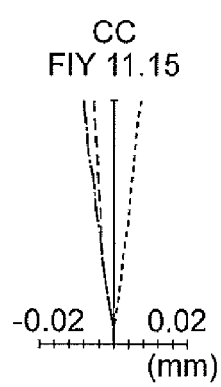
Figure 8I:
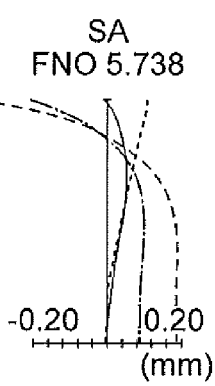
Figure 8J:
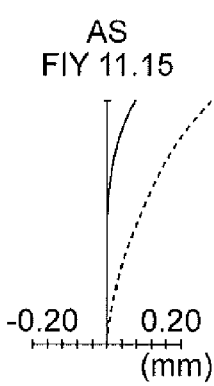
Figure 8K:
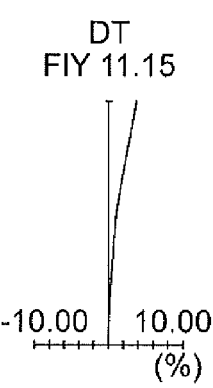
Figure 8L:
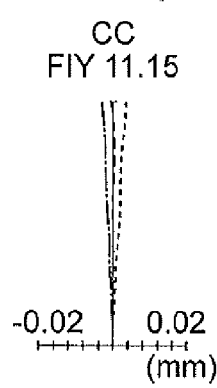
Figure 9A:
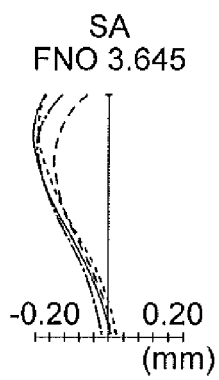
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the zoom lens according to the example 4.
Figure 9B:
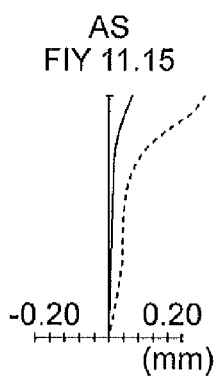
Figure 9C:
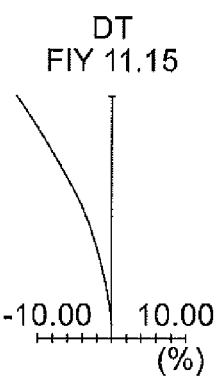
Figure 9D:
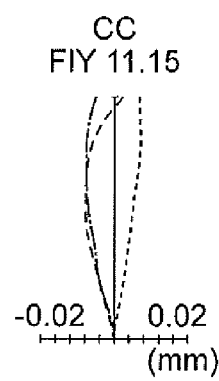
Figure 9E:
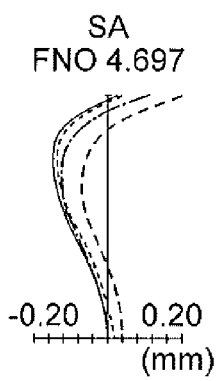
Figure 9F:
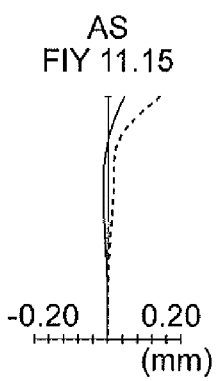
Figure 9G:
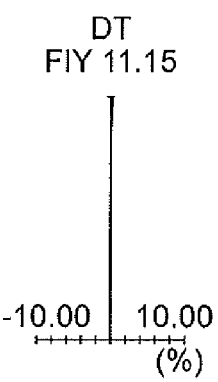
Figure 9H:
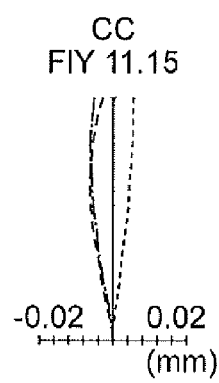
Figure 9I:
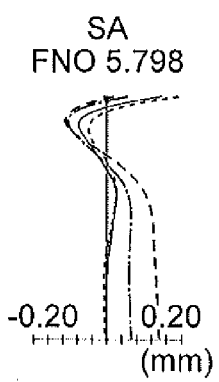
Figure 9J:
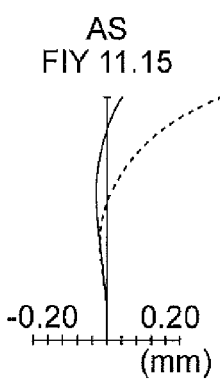
Figure 9K:
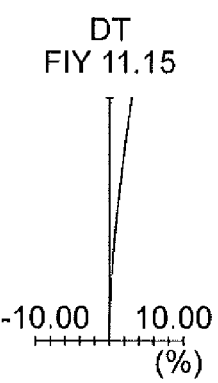
Figure 9L:
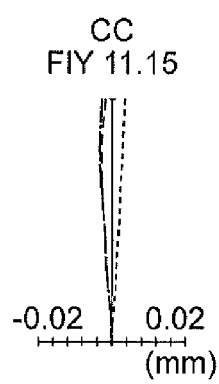
Figure 10A:
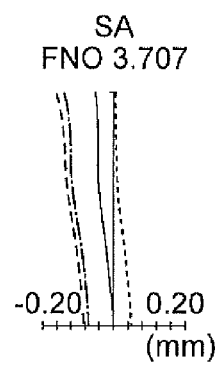
FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens according to the example 5.
Figure 10B:
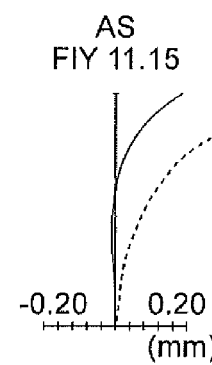
Figure 10C:
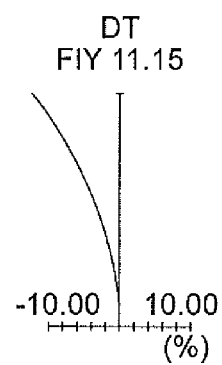
Figure 10D:
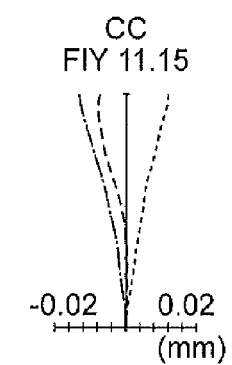
Figure 10E:
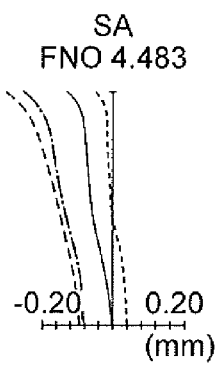
Figure 10F:
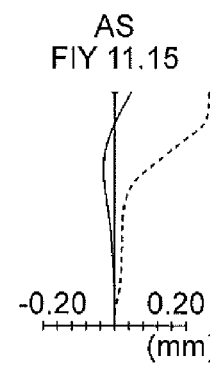
Figure 10G:
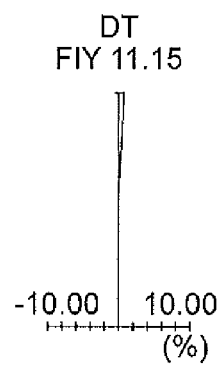
Figure 10H:
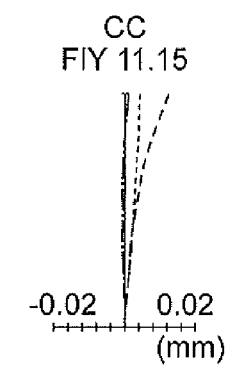
Figure 10I:
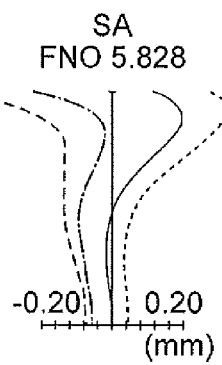
Figure 10J:
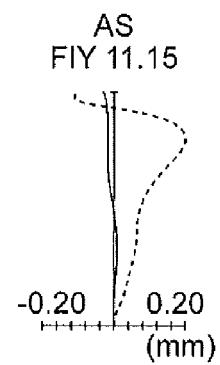
Figure 10K:
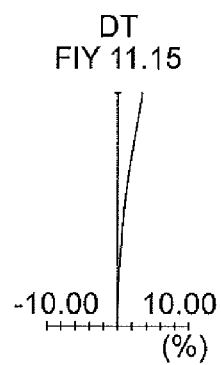
Figure 10L:
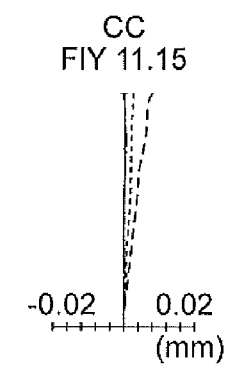

The zoom lens according to the example 5, as shown in FIG. 5A, FIG. 5B, and FIG. 5C, includes in order from an object side, a first lens unit G1 having a negative refractive power, a second lens unit G2 having a positive refractive power, a third lens unit G3 having a negative refractive power, and a fourth lens unit G4 having a positive refractive power. An aperture stop (stop) S is disposed in the second lens unit G2.

The first lens unit G1 includes a biconcave negative lens L1 and a positive meniscus lens L2 having a convex surface directed toward the object side.

The second lens unit G2 includes a positive meniscus lens L3 having a convex surface directed toward the object side, a negative meniscus lens L4 having a convex surface directed toward the object side, and a positive meniscus lens L5 having a convex surface directed toward the object side. Here, the negative meniscus lens L4 and the positive meniscus lens L5 are cemented.

The third lens unit G3 includes a negative meniscus lens L6 having a convex surface directed toward the object side. A cyclo-olefin polymer (specific gravity: 1.019 g/cm$^3$) is used for the negative meniscus lens L6.

The fourth lens unit G4 includes a biconvex positive lens L7.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop (stop) S moves toward the object side together with the second lens unit G2.

At the time of focusing, the third lens unit G3 moves along an optical axis.

An aspheric surface is provided to a total of 11 surfaces namely, both surfaces of the biconcave negative lens L1, both surfaces of the positive meniscus lens L2, both surfaces of the positive meniscus lens L3, an image-side surface of the positive meniscus lens L5, both surfaces of the negative meniscus lens L6, and both surfaces of the biconvex positive lens L7.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus, Lens total length is a distance from a lens forefront surface up to a lens backmost surface (without air conversion) and each of f1, f2 . . . is a focal length of each lens unit. Further, FB (back focus) is a unit which is expressed upon air conversion of a distance from the lens backmost surface to a paraxial image surface. Further, WE denotes a wide angle end, ST denotes a intermediate focal length state, TE denotes a telephoto end.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}+A12y^{12}$$

Further, in the aspherical surface coefficients, 'e-n' (where, n is an integral number) indicates '10$^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 33.501 | 0.800 | 1.77250 | 49.60 |
| 2 | 11.209 | 4.041 | | |
| 3 | −45.096 | 0.700 | 1.49700 | 81.54 |
| 4 | 23.551 | 0.289 | | |
| 5 | 16.607 | 1.820 | 2.00100 | 29.13 |
| 6 | 30.330 | Variable | | |
| 7* | 10.861 | 2.248 | 1.80139 | 45.45 |
| 8* | 234.877 | 0.539 | | |
| 9(Stop) | ∞ | 1.100 | | |
| 10 | 903.915 | 0.400 | 1.66680 | 33.05 |
| 11 | 7.093 | 3.523 | 1.49700 | 81.54 |
| 12* | −19.000 | Variable | | |
| 13* | −36.032 | 0.600 | 1.53071 | 55.69 |
| 14* | 19.120 | Variable | | |
| 15* | 681.183 | 4.279 | 1.53071 | 55.69 |
| 16* | −19.776 | 14.218 | | |
| Image plane | ∞ | | | |

Aspherical surface data

7th surface k = 0.0000
A4 = 5.7968e−005, A6 = 5.3399e−007, A8 = 4.2448e−008,
A10 = 3.5914e−010, A12 = 1.8404e−012

8th surface k = 0.0000
A4 = 1.7402e−004, A6 = −1.2118e−006, A8 = 1.1537e−007,
A10 = −8.4375e−010, A12 = −2.0822e−011

12th surface k = 0.0000
A4 = 6.3514e−005, A6 = 8.6302e−006, A8 = −4.8301e−007,
A10 = 1.7306e−008, A12 = −2.6091e−011

13th surface k = 0.0000
A4 = 1.3252e−003, A6 = −3.5798e−005, A8 = −6.7078e−007,
A10 = 4.2140e−008, A12 = 1.1014e−010

14th surface k = 0.0000
A4 = 1.4150e−003, A6 = −3.2179e−005, A8 = −7.7489e−007,
A10 = 4.2602e−008, A12 = −2.5783e−011

15th surface k = 0.0000
A4 = −7.3221e−005, A6 = 1.8445e−006, A8 = −8.7997e−009,
A10 = −2.8574e−011, A12 = 2.2692e−013

16th surface k = 0.0000
A4 = −4.0767e−005, A6 = 5.4018e−008, A8 = 1.9184e−008,
A10 = −2.0974e−010, A12 = 6.4768e−013

| Zoom data | | | |
|---|---|---|---|
|  | WE | ST | TE |
| f | 14.240 | 24.250 | 41.180 |
| Fno. | 3.596 | 4.418 | 5.802 |
| 2ω | 82.4 | 49.4 | 29.9 |
| IH | 11.15 | 11.15 | 11.15 |

-continued

| Unit mm | | | |
|---|---|---|---|
| FB | 14.218 | 14.218 | 14.218 |
| Lens total length | 48.919 | 44.885 | 47.867 |
| d6 | 18.700 | 7.466 | 0.500 |
| d12 | 2.031 | 5.615 | 11.656 |
| d14 | 7.849 | 11.465 | 15.372 |

| Unit focal length | | | |
|---|---|---|---|
| f1 = −19.884 | f2 = 14.338 | f3 = −23.449 | f4 = 36.289 |

EXAMPLE 2

| Unit mm | | | | |
|---|---|---|---|---|
| Surface data | | | | |
| Surface no. | r | d | nd | νd |
| Object plane | ∞ | ∞ | | |
| 1 | 64.702 | 0.800 | 1.69680 | 55.53 |
| 2 | 11.606 | 3.422 | | |
| 3 | −88.327 | 0.700 | 1.49700 | 81.54 |
| 4 | 27.506 | 0.200 | | |
| 5* | 15.778 | 1.914 | 1.63493 | 23.90 |
| 6* | 31.865 | Variable | | |
| 7* | 10.795 | 2.116 | 1.80139 | 45.45 |
| 8* | 113.014 | 0.849 | | |
| 9(Stop) | ∞ | 1.000 | | |
| 10 | 28.817 | 0.400 | 1.90366 | 31.32 |
| 11 | 7.100 | 3.500 | 1.59201 | 67.02 |
| 12* | −24.966 | Variable | | |
| 13* | −171.145 | 0.600 | 1.53071 | 55.69 |
| 14* | 11.052 | Variable | | |
| 15* | −97.090 | 3.574 | 1.76802 | 49.24 |
| 16* | −20.177 | 14.438 | | |
| Image plane | ∞ | | | |

Aspherical surface data

5th surface k = 0.0000
A4 = −8.1884e−005, A6 = −2.7042e−007, A8 = 1.4238e−008,
A10 = −4.0588e−010

6th surface k = 0.0000
A4 = −9.9349e−005, A6 = 4.2182e−007, A8 = −6.1084e−009,
A10 = −2.2166e−010

7th surface k = 0.0000
A4 = 4.2062e−005, A6 = −5.7246e−007, A8 = 7.1083e−008,
A10 = −1.2063e−009

8th surface k = 0.0000
A4 = 1.6242e−004, A6 = −1.7979e−006, A8 = 1.0048e−007,
A10 = −2.0625e−009

12th surface k = 0.0000
A4 = 3.4943e−005, A6 = 2.8257e−006, A8 = −7.7626e−008,
A10 = 4.2720e−009

13th surface k = 0.0000
A4 = 5.1140e−004, A6 = −3.3672e−006, A8 = 1.0216e−006,
A10 = −1.3810e−008

14th surface k = 0.0000
A4 = 5.7630e−004, A6 = −3.2837e−005, A8 = 8.6468e−007,
A10 = −1.0733e−008

15th surface k = 0.0000
A4 = −3.8824e−005, A6 = 7.4513e−007, A8 = −2.1479e−009,
A10 = −1.0307e−011

16th surface k = 0.0000
A4 = −2.5322e−005, A6 = 2.0336e−007, A8 = 3.7625e−009,
A10 = −2.9594e−011

| Zoom data | | | |
|---|---|---|---|
| | WE | ST | TE |
| f | 14.240 | 24.250 | 41.180 |
| Fno. | 3.599 | 4.422 | 5.731 |
| 2ω | 82.4 | 49.2 | 29.4 |
| IH | 11.15 | 11.15 | 11.15 |
| FB | 14.438 | 14.438 | 14.438 |
| Lens total length | 46.746 | 44.301 | 46.603 |
| d6 | 17.597 | 7.338 | 0.500 |
| d12 | 2.235 | 5.330 | 11.119 |
| d14 | 7.839 | 12.558 | 15.909 |

| Unit focal length | | | |
|---|---|---|---|
| f1 = −18.802 | f2 = 13.533 | f3 = −19.540 | f4 = 32.507 |

EXAMPLE 3

| Unit mm | | | | |
|---|---|---|---|---|
| Surface data | | | | |
| Surface no. | r | d | nd | νd |
| Object plane | ∞ | ∞ | | |
| 1 | 26.756 | 0.500 | 1.80400 | 46.57 |
| 2 | 9.825 | 3.870 | | |
| 3* | −59.361 | 0.600 | 1.53071 | 55.69 |
| 4* | 20.071 | 0.344 | | |
| 5* | 12.459 | 2.108 | 1.63493 | 23.90 |
| 6* | 33.129 | Variable | | |
| 7* | 11.351 | 2.578 | 1.80610 | 40.88 |
| 8* | −73.783 | 1.000 | | |
| 9(Stop) | ∞ | 0.961 | | |
| 10 | 54.984 | 0.519 | 1.80000 | 29.84 |
| 11 | 6.363 | 3.937 | 1.49700 | 81.54 |
| 12 | −18.990 | 0.000 | | |
| 13(Stop) | ∞ | Variable | | |
| 14* | −38.199 | 0.525 | 1.53071 | 55.69 |
| 15* | 13.061 | Variable | | |
| 16 | 72.188 | 3.692 | 1.76200 | 40.10 |
| 17 | −35.038 | 14.481 | | |
| Image plane | ∞ | | | |

Aspherical surface data

3rd surface k = 0.0000
A4 = 6.6345e−005, A6 = −5.0207e−007, A8 = 2.1595e−009

4th surface k = 0.0000
A4 = −2.2600e−005

5th surface k = 0.0000
A4 = −8.7714e−005

6th surface k = 0.0000
A4 = 4.8290e−006, A6 = −4.7938e−007, A8 = 2.6845e−009

-continued

Unit mm

7th surface k = 0.0000
A4 = −3.2000e−005, A6 = −3.6289e−007, A8 = −3.0000e−009

8th surface k = 0.0000
A4 = 7.2057e−005, A6 = −4.5933e−007

14th surface k = 0.0000
A4 = 2.8473e−005, A6 = 2.1654e−006

15th surface k = 0.0000
A4 = 5.6057e−005, A6 = 4.7498e−007, A8 = −1.1679e−008

Zoom data

|  | WE | ST | TE |
|---|---|---|---|
| f | 14.233 | 24.250 | 41.282 |
| Fno. | 3.640 | 4.518 | 5.738 |
| 2ω | 82.4 | 49.5 | 29.1 |
| IH | 11.15 | 11.15 | 11.15 |
| FB | 14.481 | 14.481 | 14.481 |
| Lens total length | 48.096 | 46.306 | 48.308 |
| d6 | 17.971 | 7.749 | 0.700 |
| d13 | 1.857 | 5.158 | 11.607 |
| d15 | 7.634 | 12.765 | 15.367 |

Unit focal length f1 = −18.194  f2 = 13.826  f3 = −18.275  f4 = 31.424

EXAMPLE 4

Unit mm

Surface data

| Surface no. | r | d | nd | νd |
|---|---|---|---|---|
| Object plane | ∞ | ∞ | | |
| 1 | 44.846 | 0.500 | 1.77250 | 49.60 |
| 2 | 10.080 | 4.150 | | |
| 3* | −40.189 | 0.760 | 1.53071 | 55.69 |
| 4* | 38.530 | 0.190 | | |
| 5 | 17.821 | 1.700 | 2.00069 | 25.46 |
| 6 | 37.691 | Variable | | |
| 7* | 12.147 | 2.711 | 1.74156 | 49.21 |
| 8* | −62.740 | 1.000 | | |
| 9(Stop) | ∞ | 1.120 | | |
| 10 | 136.852 | 0.520 | 1.74951 | 35.33 |
| 11 | 6.962 | 4.200 | 1.49700 | 81.54 |
| 12 | −15.588 | Variable | | |
| 13* | 47.328 | 0.400 | 1.53071 | 55.69 |
| 14* | 10.352 | Variable | | |
| 15 | −99.929 | 2.300 | 1.83481 | 42.73 |
| 16 | −26.850 | 15.335 | | |
| Image plane | ∞ | | | |

Aspherical surface data

3rd surface k = 0.0000
A4 = 6.6785e−005, A6 = −8.8705e−007, A8 = −9.6050e−010,
A10 = −8.1513e−013

4th surface k = 0.0000
A4 = 5.6775e−005, A6 = −1.1574e−006, A8 = −1.5695e−011

-continued

Unit mm

7th surface k = 0.0000
A4 = −2.4426e−005, A6 = −3.5991e−007, A8 = 1.4222e−008,
A10 = −7.5500e−010

8th surface k = 0.0000
A4 = 8.7510e−005, A6 = −3.4669e−007, A8 = 3.1047e−010,
A10 = −5.2955e−010

13th surface k = 0.0000
A4 = −4.2631e−004, A6 = 8.4142e−006, A8 = 8.5933e−008,
A10 = −1.9000e−009

14th surface k = 0.0000
A4 = −4.7992e−004, A6 = 9.9258e−006, A8 = −5.6689e−008

Zoom data

|  | WE | ST | TE |
|---|---|---|---|
| f | 14.323 | 24.252 | 41.582 |
| Fno. | 3.645 | 4.697 | 5.798 |
| 2ω | 83.7 | 49.5 | 29.2 |
| IH | 11.15 | 11.15 | 11.15 |
| FB | 15.334 | 15.334 | 15.334 |
| Lens total length | 48.921 | 45.522 | 50.145 |
| d6 | 17.997 | 7.188 | 0.500 |
| d12 | 1.268 | 5.104 | 11.309 |
| d14 | 10.105 | 13.679 | 18.785 |

Unit focal length f1 = −18.140  f2 = 14.653  f3 = −25.060  f4 = 43.359

EXAMPLE 5

Unit mm

Surface data

| Surface no. | r | d | nd | νd |
|---|---|---|---|---|
| Object plane | ∞ | ∞ | | |
| 1* | −461.393 | 0.800 | 1.86400 | 40.58 |
| 2* | 11.063 | 2.637 | | |
| 3* | 18.993 | 2.251 | 1.92286 | 20.88 |
| 4* | 46.130 | Variable | | |
| 5* | 11.342 | 1.969 | 1.75501 | 51.16 |
| 6* | 81.309 | 1.264 | | |
| 7(Stop) | ∞ | 2.052 | | |
| 8 | 24.185 | 0.400 | 1.66680 | 33.05 |
| 9 | 6.053 | 3.389 | 1.55332 | 71.68 |
| 10* | 200.000 | Variable | | |
| 11* | 282.863 | 0.500 | 1.53071 | 55.69 |
| 12* | 13.402 | Variable | | |
| 13* | 156.989 | 3.483 | 1.76802 | 49.24 |
| 14* | −29.889 | 14.059 | | |
| Image plane | ∞ | | | |

Aspherical surface data

1st surface k = 0.0000
A4 = 1.3367e−005, A6 = −2.5655e−007, A8 = 8.0868e−010

2nd surface k = 0.0000
A4 = −4.4507e−005, A6 = −2.7242e−007, A8 = −7.2137e−009

-continued

Unit mm

3rd surface k = 0.0000
A4 = −4.9213e−005
4th surface k = 0.0000
A4 = −5.7000e−005
5th surface k = 0.0000
A4 = −2.2138e−005
6th surface k = 0.0000
A4 = 3.7409e−006, A6 = 2.5909e−008
10th surface k = 0.0000
A4 = 1.8000e−004, A6 = 2.1105e−006, A8 = −7.0000e−009
11th surface k = 0.0000
A4 = −4.7516e−006, A6 = −9.9206e−006, A8 = 5.1820e−007,
A10 = −9.8198e−009
12th surface k = 0.0000
A4 = −4.9496e−007, A6 = −6.6995e−006, A8 = 2.9424e−007,
A10 = −5.4932e−009
13th surface k = 0.0000
A4 = −2.0000e−005, A6 = 8.4626e−008, A8 = 3.4000e−009,
A10 = −3.6422e−011
14th surface k = 0.0000
A4 = −1.1571e−005, A6 = −2.7433e−007, A8 = 7.3343e−009,
A10 = −4.8697e−011

Zoom data

|  | WE | ST | TE |
|---|---|---|---|
| f | 14.370 | 24.361 | 41.394 |
| Fno. | 3.707 | 4.483 | 5.828 |
| 2ω | 83.1 | 48.9 | 29.2 |
| IH | 11.15 | 11.15 | 11.15 |
| FB | 14.058 | 14.058 | 14.058 |
| Lens total length | 47.521 | 43.230 | 47.605 |
| d4 | 19.793 | 8.008 | 0.908 |
| d10 | 1.831 | 6.211 | 13.087 |
| d12 | 7.152 | 10.266 | 14.865 |

Unit focal length f1 = −21.792   f2 = 15.820   f3 = −26.526   f4 = 32.960

Aberration diagrams of the examples from the example 1 to example 5 are shown in diagrams from FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L to FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L. Each of the aberration diagrams is an aberration diagram when focused to an object at infinity. Moreover, in each diagram 'FIY' indicates the maximum image height.

In the aberration diagrams, diagrams from FIG. 6A, FIG. 7A, FIG. 8A, FIG. 9A, and FIG. 10A to FIG. 6D, FIG. 7D, FIG. 8D, FIG. 9D, and FIG. 10D are diagrams at a wide angle end. FIG. 6A, FIG. 7A, FIG. 8A, FIG. 9A, and FIG. 10A show a spherical aberration (SA), FIG. 6B, FIG. 7B, FIG. 8B, FIG. 9B, and FIG. 10B show an astigmatism (AS), FIG. 6C, FIG. 7C, FIG. 8C, FIG. 9C, and FIG. 10C show a distortion (DT), and FIG. 6D, FIG. 7D, FIG. 8D, FIG. 9D, and FIG. 10D show a chromatic aberration of magnification (CC).

Moreover, diagrams from FIG. 6E, FIG. 7E, FIG. 8E, FIG. 9E, and FIG. 10E to FIG. 6H, FIG. 7H, FIG. 8H, FIG. 9H, and FIG. 10H are aberration diagrams in an intermediate focal length state. FIG. 6E, FIG. 7E, FIG. 8E, FIG. 9E, and FIG. 10E show a spherical aberration (SA), FIG. 6F, FIG. 7F, FIG. 8F, FIG. 9F, and FIG. 10F show an astigmatism (AS), FIG. 6G, FIG. 7G, FIG. 8G, FIG. 9G, and FIG. 10G show a distortion (DT), and FIG. 6H, FIG. 7H, FIG. 8H, FIG. 9H, and FIG. 10H show a chromatic aberration of magnification (CC).

Furthermore, diagrams from FIG. 6I, FIG. 7I, FIG. 8I, FIG. 9I, and FIG. 10I to FIG. 6L, FIG. 7L, FIG. 8L, FIG. 9L, and FIG. 10L are aberration diagrams at a telephoto end. FIG. 6I, FIG. 7I, FIG. 8I, FIG. 9I, and FIG. 10I show a spherical aberration (SA), FIG. 6J, FIG. 7J, FIG. 8J, FIG. 9J, and FIG. 10J show an astigmatism (AS), FIG. 6K, FIG. 7K, FIG. 8K, FIG. 9K, and FIG. 10K show a distortion (DT), and FIG. 6L, FIG. 7L, FIG. 8L, FIG. 9L, and FIG. 10L show a chromatic aberration of magnification (CC).

Next, values of conditional expressions (1) to (24) in each example are given below. Specific gravity is a value for the negative lens in the third lens unit. Moreover, '-' (hyphen) indicates that there is no arrangement for calculating the value.

|  | Example 1 | Example 2 | Example 3 | Example 4 | Example 5 |
|---|---|---|---|---|---|
| (1) $\Delta D_{12}/ER_S$ | 4.09 | 3.758 | 3.675 | 3.637 | 4.197 |
| (2) $|f_3/f_{UN21}|$ | 1.658 | 1.324 | 1.477 | 1.798 | 1.538 |
| (3) $SF_{2N}$ | 0.31 | 0.53 | 0.49 | 0.02 | — |
| (4) $\Delta D_{12}/IH_{MAX}$ | 1.632 | 1.533 | 1.549 | 1.569 | 1.694 |
| (5) $|f_3/f_W|$ | 1.647 | 1.372 | 1.284 | 1.75 | 1.846 |
| (6) $\Sigma_{2G}/f_2$ | 0.54 | 0.58 | 0.65 | 0.65 | 0.57 |
| (7) $f_{UN21}/f_2$ | 0.987 | 1.09 | 0.895 | 0.951 | 1.09 |
| (8) $|f_3/f_2|$ | 1.64 | 1.44 | 1.32 | 1.71 | 1.68 |
| (9) $f_2/IH_{MAX}$ | 1.29 | 1.21 | 1.24 | 1.31 | 1.42 |
| (10) $f_{UN21}/ER_S$ | 3.179 | 3.243 | 2.632 | 2.897 | 3.833 |
| (11) $LTL_{min}/fb_{LTLmin}$ | 4.157 | 4.068 | 4.198 | 3.969 | 4.075 |
| (12) $DT_W$ | −10.56 | −10.56 | −10.51 | −13.09 | −12.45 |
| (13) $SF_{UN21}$ | −1.1 | −1.21 | −0.73 | −0.68 | −1.32 |
| (14) $\Sigma_{2G}/f_W$ | 0.55 | 0.55 | 0.63 | 0.67 | 0.63 |
| (15) $|f_3/IH_{MAX}|$ | 2.1 | 1.75 | 1.64 | 2.25 | 2.38 |
| (16) $v_{p1}$ | 81.54 | 67.02 | 81.54 | 81.54 | 71.68 |
| (17) $fb_w/IH_{MAX}$ | 1.28 | 1.29 | 1.3 | 1.38 | 1.26 |
| (18) $f_1/f_3$ | 0.85 | 0.96 | 1 | 0.72 | 0.82 |
| (19) $LTL_w/fb_w$ | 4.44 | 4.24 | 4.32 | 4.19 | 4.38 |
| (20) $f_{UN21}/f_W$ | 0.993 | 1.036 | 0.869 | 0.973 | 1.2 |
| (21) $\Delta D_{12}/f_T$ | 0.442 | 0.415 | 0.418 | 0.421 | 0.456 |
| (22) $|f_3/ER_S|$ | 0.756 | 0.464 | 0.648 | 0.678 | 0.788 |
| (23) $|ASP_O - ASP_I|/IH_{33W}$ | — | 0.0014 | 0.0006 | 0.0057 | — |
| (24) $f_T/f_W$ | 2.89 | 2.89 | 2.90 | 2.90 | 2.88 |
| specific gravity(g/cm³) | 1.01 | 1.01 | 1.01 | 1.01 | 1.01 |

Figure 13:
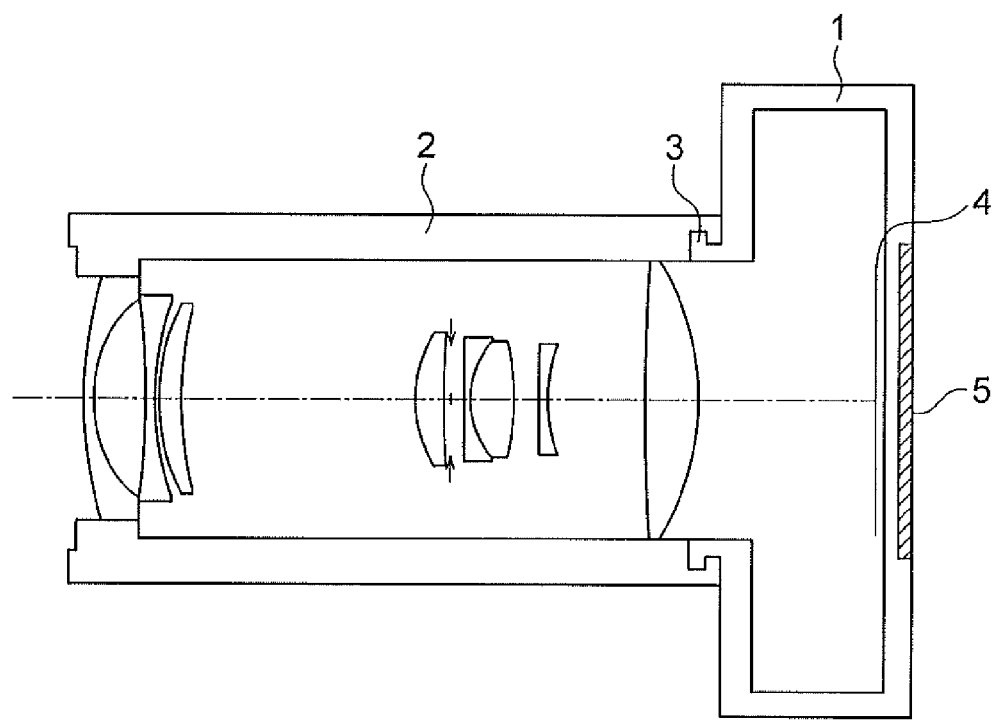
FIG. 13 is a cross-sectional view of an image pickup apparatus.

FIG. 13 is a cross-sectional view of an interchangeable lens camera as an electronic image pickup apparatus. The interchangeable lens camera is a single-lens mirrorless camera which is a camera of the type not to have a quick return mirror, for example. In FIG. 13, a taking optical system. 2 is disposed inside a lens barrel of a single-lens mirrorless camera 1. A mount portion 3 enables the taking optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking optical system 2 of the single-lens mirrorless camera 1, the zoom lens described in any one of the examples from the first example to the fifth example is to be used.

Figure 14:
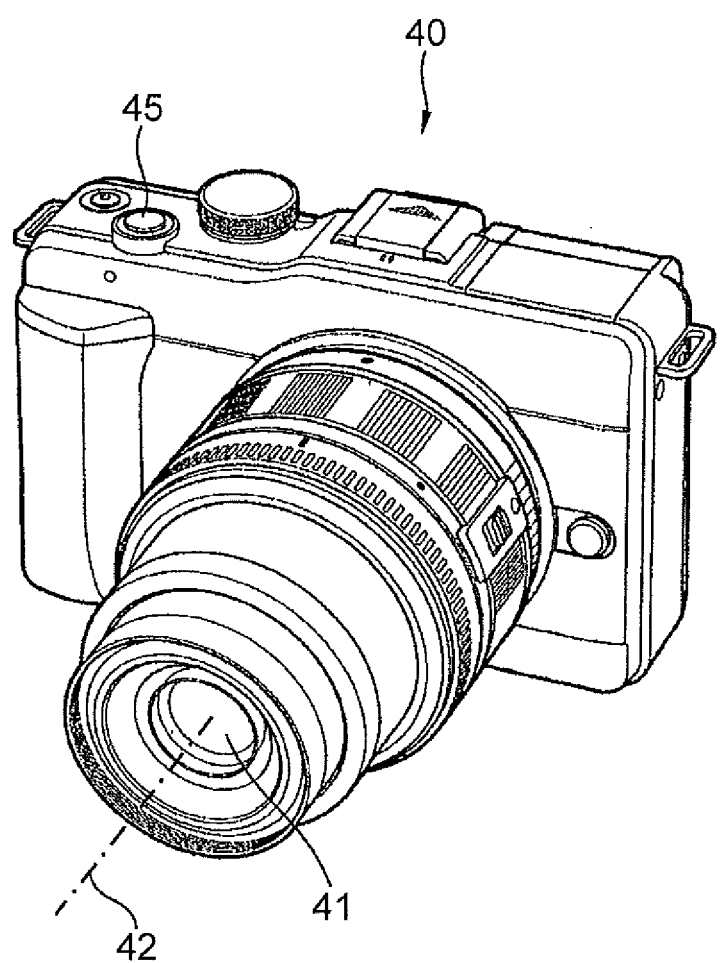
FIG. 14 is a front perspective view showing an appearance of the image pickup apparatus.
Figure 15:
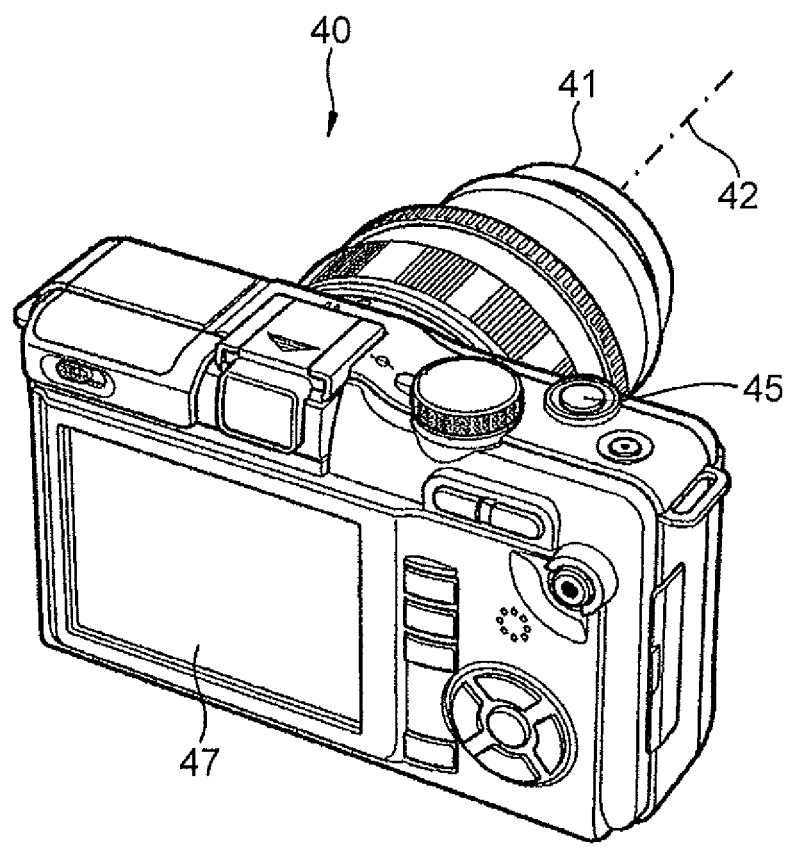
FIG. 15 is a rear perspective view of the image pickup apparatus.

FIG. 14 and FIG. 15 are conceptual diagrams of an arrangement of the image pickup apparatus which has the zoom lens according to the present example. FIG. 14 is a front perspective view showing an appearance of a single-lens mirrorless camera 40 as the image pickup apparatus, and FIG. 15 is a rear perspective view of the single-lens mirrorless camera 40. The zoom lens according to the present example is used in a photographic optical system 41 of the single-lens mirrorless camera 40.

The single-lens mirrorless camera 40 according to the present embodiment includes the photographic optical system 41 which is positioned in a photographic optical path 42, a shutter button 45, and a liquid-crystal display monitor 47. As the shutter button 45 disposed on an upper portion of the single-lens mirrorless camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 16:
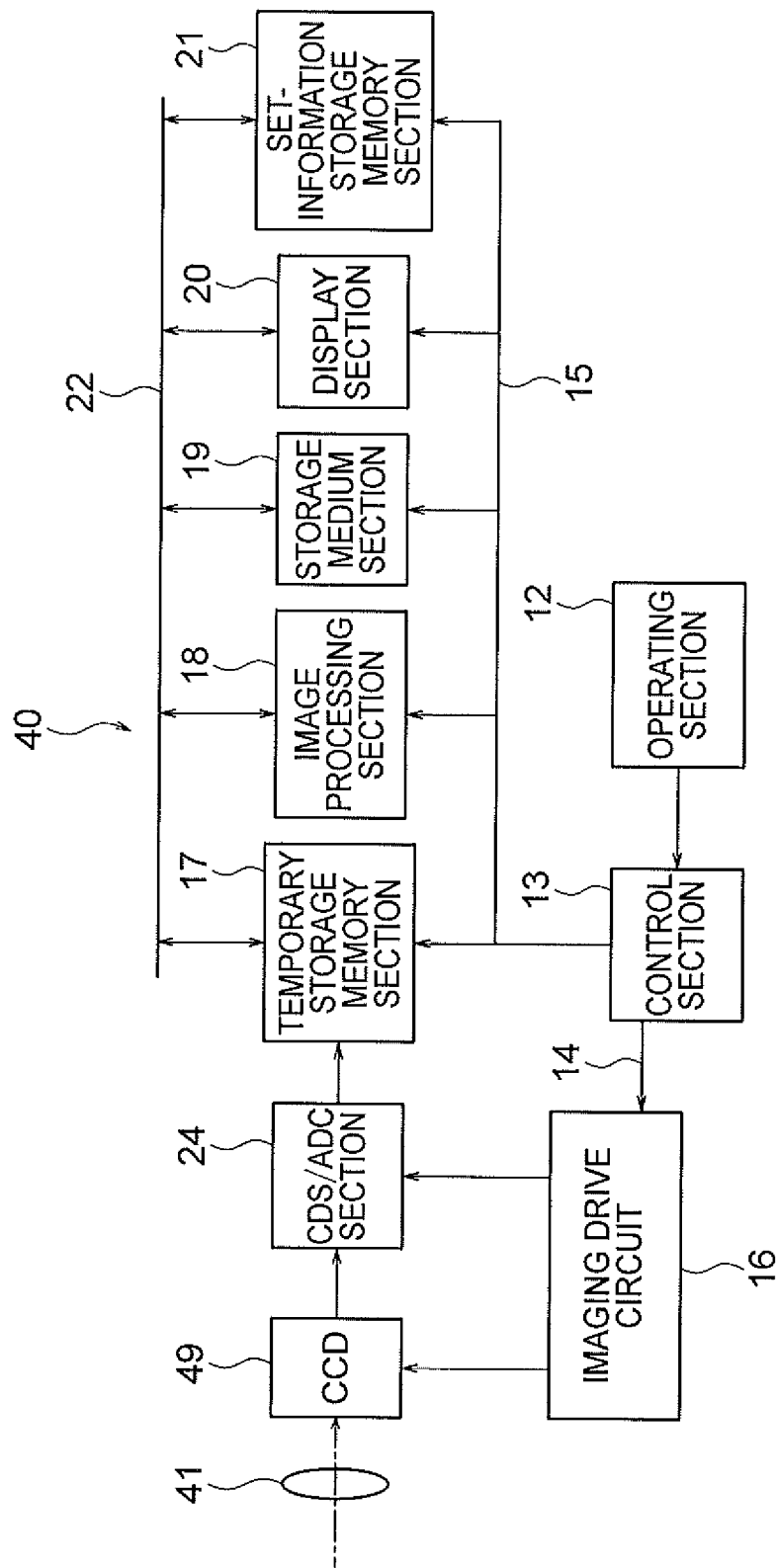
FIG. 16 is a block diagram of a configuration of an internal circuit of main components of the image pickup apparatus.

FIG. 16 is a structural block diagram of an internal circuit of main components of the single-lens mirrorless camera 40. In the following description, the processing means described above includes for instance, a CDS/ADC section 24, a temporary storage memory 17, and an image processing section 18, and a storage means consists of a storage medium section 19 for example.

As shown in FIG. 16, the single-lens mirrorless camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire single-lens mirrorless camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The single-lens mirrorless camera 40 structured in such manner can be an image pickup apparatus having a zoom lens in which, both favorable correction of various aberrations and small-sizing. Moreover, the zoom lens according to the present invention can be used for an image pickup apparatus of the type which optical system is fixed to a body of the image pickup apparatus.

According to the present invention, it is possible to provide a zoom lens in which, both favorable correction of various aberrations and small-sizing of the optical system are achieved, and an image pickup apparatus using such zoom lens.

As it has been described so far, the present invention is suitable for a zoom lens in which, both favorable correction of various aberrations and small-sizing of the optical system are achieved, and the image pickup apparatus using such zoom lens.

What is claimed is:

1. A zoom lens comprising in order from an object side to an image side:
   a first lens unit having a negative refractive power;
   a second lens unit having a positive refractive power; and
   a third lens unit having a negative refractive power,
      wherein
   at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power and an image-side sub lens unit, and the object-side sub lens unit in the second lens unit includes one lens component, and in the lens component, only an object-side surface and an image-side surface are in contact with air in an optical path, and the following conditional expressions (1) and (2) are satisfied $$3.0 < \Delta D_{12}/ER_S < 4.5 \quad (1)$$

$$1.05 < |f_3/f_{UN21}| < 2.1 \quad (2)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $ER_S$ denotes the maximum radius of an opening of the aperture stop, $f_3$ denotes a focal length of the third lens unit, and $f_{UN21}$ denotes a focal length of the object-side sub lens unit in the second lens unit.

2. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the second lens unit includes in order from the object side to the image side, an object-side sub lens unit having a positive refractive power, and an image-side sub lens unit, and the object-side sub lens unit in the second lens unit includes one lens component, and in the lens component, only an object-side surface and an image-side surface are in contact with air in an optical path, and the following conditional expressions (1) and (3) are satisfied $$3.0 < \Delta D_{12}/ER_S < 4.5 \quad (1)$$

$$-0.9 < SF_{2N} < 1.5 \quad (3)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $ER_S$ denotes the maximum radius of an opening of the aperture stop, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

3. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power and an image-side sub lens unit, and the object-side sub lens unit in the second lens unit includes one lens component, and in the lens component, only an object-side surface and an image-side surface are in contact with air in an optical path, and the following conditional expressions (2'), (4), (5') and (8') are satisfied $$1.2 < |f_3/f_{UN21}| < 2.1 \quad (2')$$

$$1.2 < \Delta D_{12}/IH_{MAX} < 1.85 \quad (4)$$

$$1.1 < |f_3/f_W| < 1.9 \quad (5')$$

$$1.3 < |f_3/f_2| < 1.95 \quad (8')$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $IH_{MAX}$ denotes the maximum image height, and denotes the maximum value in a case in which, the maximum image height changes with zooming, $f_3$ denotes a focal length of the third lens unit, $f_W$ denotes a focal length of the overall zoom lens system at the time of infinite object point focusing at the wide angle end, $f_2$ denotes a focal length of the second lens unit, and $f_{UN21}$ denotes a focal length of the object-side sub lens unit in the second lens unit.

4. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the following conditional expressions (4) and (6) are satisfied $$1.2 < \Delta D_{12}/IH_{MAX} < 1.85 \quad (4)$$

$$0.43 < \Sigma_{2G}/f_2 < 0.78 \quad (6)$$

where, $$\Delta D_{12} = D_{12W} - D_{12T},$$

$D_{12W}$ denotes the distance between the first lens unit and the second lens unit at the wide angle end, $D_{12T}$ denotes the distance between the first lens unit and the second lens unit at the telephoto end, both $D_{12W}$ and $D_{12T}$ are distances on an optical axis at the time of infinite object point focusing, $IH_{MAX}$ denotes the maximum image height, and denotes the maximum value in a case in which, the maximum image height changes with zooming, $\Sigma_{2G}$ denotes a thickness on an optical axis of the second lens unit, and $f_2$ denotes a focal length of the second lens unit.

5. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the second lens unit includes in order from the object side to the image side, an object-side sub lens unit having a positive refractive power, and an image-side sub lens unit, and the object-side sub lens unit in the second lens unit includes one lens component, and in the lens component, only an object-side surface and an image-side surface are in contact with air in an optical path, and the following conditional expressions (7), (8'),(9) and (14) are satisfied $$0.6 < f_{UN21}/f_2 < 1.8 \quad (7)$$

$$1.3 < |f_3/f_2| < 1.95 \quad (8')$$

$$1.15 < f_2/IH_{MAX} < 1.5 \quad (9)$$

$$0.38 < \Sigma_{2G}/f_W < 0.75 \quad (14)$$

where, $f_{UN21}$ denotes a focal length of the object-side sub lens unit in the second lens unit, $f_2$ denotes a focal length of the second lens unit, $f_3$ denotes a focal length of the third lens unit, $IH_{MAX}$ denotes the maximum image height, and denotes the maximum value in a case in which, the maximum image height changes with zooming, $\Sigma_{2G}$ denotes a thickness of the second lens unit on an optical axis, and $f_W$ denotes a focal length of the overall zoom lens system at the time of infinite object point focusing at the wide angle end.

6. A zoom lens comprising in order from an object side to an image side:

a first lens unit having a negative refractive power;

a second lens unit having a positive refractive power; and a third lens unit having a negative refractive power, wherein at the time of zooming, distances between the lens units change, and a distance between the first lens unit and the second lens unit at a telephoto end is shorter than a distance between the first lens unit and the second lens unit at a wide angle end, and an aperture stop is disposed on the image side of an image-side surface of the first lens unit, and on the object side of an image-side surface of the second lens unit, and the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens, and the second lens unit includes in order from the object side to the image side, an object-side sub lens unit having a positive refractive power, and an image-side sub lens unit, and the object-side sub lens unit in the second lens unit includes one lens component, and in the lens component, only an object-side surface and an image-side surface are in contact with air in an optical path, and the image-side sub lens unit in the second lens unit includes a lens surface having a negative refractive power and a positive lens which is disposed on the image side of the lens surface, and the following conditional expressions (3), (10), and (11) are satisfied $$-0.9 < SF_{2N} < 1.5 \quad (3)$$

$$1.5 < f_{UN21}/ER_S < 3.9 \quad (10)$$

$$3 < LTL_{min}/fb_{LTLmin} < 13 \quad (11)$$

where, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit, $f_{UN21}$ denotes a focal length of the object-side sub lens unit in the second lens unit, $ER_S$ denotes the maximum radius of an opening of the aperture stop, $LTL_{min}$ denotes a sum of an overall length of the zoom lens at the time of infinite object point focusing and an air-converted back focus, and is the minimum value thereof in a case in which, the overall length changes with zooming, and the overall length is a distance on an optical axis from a refracting surface of the zoom lens nearest to the object side and a refracting surface of the zoom lens nearest to the image side, and $fb_{LTLmin}$ denotes the air-converted back focus at $LTL_{min}$.

7. A zoom lens comprising in order from an object side to an image side:
a first lens unit having a negative refractive power;
a second lens unit having a positive refractive power; and
a third lens unit having a negative refractive power, wherein
at the time of zooming, distances between the lens units change, and
a distance between the first lens unit and the second lens unit at a telephoto end is shorter than a distance between the first lens unit and the second lens unit at a wide angle end, and
an aperture stop is disposed on the image side of an image-side surface of the first lens unit, and on the object side of an image-side surface of the second lens unit, and
the second lens unit includes in order from the object side to the image side, an object-side sub lens unit having a positive refractive power, and an image-side sub lens unit, and
the object-side sub lens unit in the second lens unit includes one lens component, and
in the lens component, only an object-side surface and an image-side surface are in contact with air in an optical path, and
the following conditional expressions (2) and (4) are satisfied $$1.05 < |f_3/f_{UN21}| < 2.1 \quad (2)$$

$$1.2 < \Delta D_{12}/IH_{MAX} < 1.85 \quad (4)$$

where,
$f_3$ denotes a focal length of the third lens unit, and
$f_{UN21}$ denotes a focal length of the object-side sub lens unit in the second lens unit, $$\Delta D_{12} = D_{12W} - D_{12T},$$

$D_{12W}$ denotes the distance between the first lens unit and the second lens unit at the wide angle end,
$D_{12T}$ denotes the distance between the first lens unit and the second lens unit at the telephoto end,
both $D_{12W}$ and $D_{12T}$ are distances on an optical axis at the time of infinite object point focusing, and
$IH_{MAX}$ denotes the maximum image height, and denotes the maximum value in a case in which, the maximum image height changes with zooming.

8. The zoom lens according to claim 1, further comprising:
a fourth lens unit having a positive refractive power, disposed on the image side of the third lens unit, wherein
at the time of zooming, a distance between the third lens unit and the fourth lens unit changes.

9. The zoom lens according to claim 8, wherein a distance between the third lens unit and the fourth lens unit at the telephoto end is longer than a distance between the third lens unit and the fourth lens unit at the wide angle end.

10. The zoom lens according to claim 8, wherein the total number of lens units in the zoom lens is four, including the first lens unit, the second lens unit, the third lens unit, and the fourth lens unit.

11. The zoom lens according to claim 1, wherein the object-side sub lens unit and the image-side sub lens unit in the second lens unit are disposed such that, an axial air space between the object-side sub lens unit and the image-side sub lens unit is the maximum in the second lens unit.

12. The zoom lens according to claim 11, wherein
the image-side sub lens unit in the second lens unit includes one lens component, and
in the lens component, only the object-side surface and the image-side surface are in contact with air in the optical path.

13. The zoom lens according to claim 1, wherein the following conditional expression (5) is satisfied $$0.8 < |f_3/f_W| < 2.5 \quad (5)$$

where,
$f_3$ denotes a focal length of the third lens unit, and
$f_W$ denotes a focal length of the overall zoom lens system at the time of infinite object point focusing at the wide angle end.

14. The zoom lens according to claim 1, wherein the following conditional expression (12) is satisfied $$-20.0\% < DT_W < -6.0\% \quad (12)$$

where, $$DT_W = \{IH_W - f_W \times \tan(\omega_W)\}/\{f_W \times \tan(\omega_W)\} \times 100(\%),$$

$f_W$ denotes a focal length of the overall zoom lens system at the time of infinite object point focusing at the wide angle end,
$IH_W$ denotes the maximum image height at the time of infinite object point focusing at the wide angle end, and
$\omega_W$ denotes a half angle of view at the time of infinite object point focusing at the wide angle end.

15. The zoom lens according to claim 1, wherein
the second lens unit includes in order from the object side to the image side, the object-side sub lens unit having a positive refractive power and the image-side sub lens unit, and
the object-side sub lens unit in the second lens unit includes one lens component, and
in the lens component, only the object-side surface and the image-side surface are in contact with air in the optical path, and the following conditional expression (13) is satisfied $$-1.5 < SF_{UN21} < 0.5 \quad (13)$$

where, $$SF_{UN21} = (R_{UN21O} + R_{UN21I})/(R_{UN21O} - R_{UN21I})$$

$R_{UN21O}$ denotes a paraxial radius of curvature of an object-side surface of the object-side sub lens unit in the second lens unit, and $R_{UN21I}$ denotes a paraxial radius of curvature of an image-side surface of the object-side sub lens unit in the second lens unit.

16. The zoom lens according to claim 1, wherein the following conditional expression (14) is satisfied $$0.38 < \Sigma_{2G}/f_W < 0.75 \quad (14)$$

where, $\Sigma_{2G}$ denotes a thickness of the second lens unit on an optical axis, and $f_W$ denotes a focal length of the overall zoom lens system at the time of infinite object point focusing at the wide angle end.

17. The zoom lens according to claim 1, wherein the second lens unit includes in order from the object side to the image side, the object-side sub lens unit having a positive refractive power and the image-side sub lens unit, and the object-side sub lens unit in the second lens unit includes one lens component, and in the lens component, only the object-side surface and the image-side surface are in contact with air in the optical path, and the image-side sub lens unit in the second lens unit includes a lens surface having a negative refractive power, and a positive lens which is disposed on the image side of the lens surface.

18. The zoom lens according to claim 1, wherein the following conditional expression (8) is satisfied $$1.17 < |f_3/f_2| < 1.95 \quad (8)$$

where, $f_2$ denotes a focal length of the second lens unit, and
$f_3$ denotes a focal length of the third lens unit.

19. The zoom lens according to claim 1, wherein the following conditional expression (15) is satisfied $$1.3 < |f_3/IH_{MAX}| < 2.5 \quad (15)$$

where, $f_3$ denotes the focal length of the third lens unit, and $IH_{MAX}$ denotes the maximum image height, and denotes the maximum value in a case in which, the maximum image height changes with zooming.

20. The zoom lens according to claim 1, wherein the third lens unit includes a lens having a specific gravity more than 0.9 g/cm³ and smaller than 1.3 g/cm³.

21. The zoom lens according to claim 1, wherein the second lens unit includes a negative lens and a positive lens that satisfies the following conditional expression (16).

$$63 < v_{p1} < 96 \quad (16)$$

where, $v_{p1}$ denotes Abbe's number for a d-line of any of the positive lenses in the second lens unit.

22. The zoom lens according to claim 1, wherein the first lens unit includes in order from the object side to the image side, an object-side sub lens unit and an image-side sub lens unit, and the object-side sub lens unit in the first lens unit includes a first negative lens, and the image-side sub lens unit in the first lens unit includes a second negative lens and a first positive lens.

23. The zoom lens according to claim 22, wherein the following conditional expression (3) is satisfied $$-0.9 < SF_{2N} < 1.5 \quad (3)$$

where, $$SF_{2N} = (R_{2NO} + R_{2NI})/(R_{2NO} - R_{2NI}),$$

$R_{2NO}$ denotes a paraxial radius of curvature of an object-side surface of the second negative lens in the first lens unit, and $R_{2NI}$ denotes a paraxial radius of curvature of an image-side surface of the second negative lens in the first lens unit.

24. The zoom lens according to claim 1, wherein the following conditional expression (17) is satisfied $$0.6 < fb_W/IH_{MAX} < 1.8 \quad (17)$$

where, $fb_W$ denotes an air-converted back-focus at the time of infinite object point focusing at the wide angle end, and $IH_{MAX}$ denotes the maximum image height, and denotes the maximum value in a case in which, the maximum image height changes with zooming.

25. The zoom lens according to claim 1, wherein the following conditional expression (18) is satisfied $$0.4 < f_1/f_3 < 1.2 \quad (18)$$

where, $f_1$ denotes a focal length of the first lens unit, and
$f_3$ denotes a focal length of the third lens unit.

26. The zoom lens according to claim 1, wherein the following conditional expression (6') is satisfied $$0.45 < \Sigma_{2G}/f_2 < 0.75 \quad (6')$$

where, $\Sigma_{2G}$ denotes a thickness on an optical axis of the second lens unit, and $f_2$ denotes a focal length of the second lens unit.

27. The zoom lens according to claim 1, wherein the following conditional expression (7) is satisfied $$0.6 < f_{UN21}/f_2 < 1.8 \quad (7)$$

where, $f_{UN21}$ denotes a focal length of the object-side sub lens unit in the second lens unit, $f_2$ denotes a focal length of the second lens unit.

28. The zoom lens according to claim 1, wherein the following conditional expression (19) is satisfied $$3 < LTL_W/fb_W < 13 \quad (19)$$

where, $LTL_W$ denotes a sum of an overall length of the zoom lens at the time of infinite object point focusing at the wide angle end and an air-converted back focus, the overall length is a distance on an optical axis from a refracting surface of the zoom lens nearest to the object side and a refracting surface of the zoom lens nearest to the image side, and $fb_W$ denotes the air-converted back focus at $LTL_W$.

29. The zoom lens according to claim 1, wherein the following conditional expression (20) is satisfied $$0.6 < f_{UN21}/f_W < 1.9 \quad (20)$$

where, $f_{UN21}$ denotes a focal length of the object-side sub lens unit in the second lens unit, and $f_W$ denotes a focal length of the overall zoom lens system at the time of infinite object point focusing at the wide angle end.

30. The zoom lens according to claim 29, wherein the following conditional expression (20') is satisfied $$0.6 < f_{UN21}/f_W < 1.6 \qquad (20')$$

where, $f_{UN21}$ denotes the focal length of the object-side sub lens unit in the second lens unit, $f_W$ denotes the focal length of the overall zoom lens system at the time of infinite object point focusing at the wide angle end.

31. The zoom lens according to claim 1, wherein the following conditional expression (21) is satisfied $$0.35 < \Delta D_{12}/f_T < 0.6 \qquad (21)$$

where, $D_{12} = D_{12W} - D_{12T},$ $D_{12W}$ denotes the distance between the first lens unit and the second lens unit at the wide angle end, $D_{12T}$ denotes the distance between the first lens unit and the second lens unit at the telephoto end, both $D_W$ and $D_{12T}$ are distances on an optical axis at the time of infinite object point focusing, and $f_T$ denotes a focal length of the overall zoom lens system at the time of infinite object point focusing at the telephoto end.

32. The zoom lens according to claim 1, wherein the following conditional expression (22) is satisfied $$0.35 < |f_3/ER_S| < 1.05 \qquad (22)$$

where, $f_3$ denotes the focal length of the third lens unit, and $ER_S$ denotes the maximum radius of an opening of the aperture stop.

33. The zoom lens according to claim 1, wherein the first lens unit includes a plastic aspherical lens which satisfied the following conditional expression (23)

$$0.0001 < |ASP_o - ASP_I|/IH_{33W} < 0.02 \qquad (23)$$

where, $IH_{33W}$ denotes a distance from an optical axis of a position at which, a principal ray intersects with a paraxial image plane such that, an incidence-side half angle of view of the zoom lens at the time of infinite object point focusing at the wide angle end becomes 33°.

$ASP_o$ denotes an amount of aspherical deviation at a position at which, a distance of an object-side surface of the plastic aspherical lens from the optical axis becomes $IH_{33W}$, $ASP_I$ denotes an amount of aspherical deviation at a position at which, a distance of an image-side surface of the plastic aspherical lens from the optical axis becomes $IH_{33W}$, and the amount of aspherical deviation is a distance in an optical axial direction, from a reference spherical surface for which, a vertex of a surface intended is let to be the vertex, and a radius of curvature is let to be same as a paraxial radius of curvature of the surface intended, up to the surface intended, and a case in which, the intended surface is on the image side with respect to the reference spherical surface is let to have a positive sign.

34. The zoom lens according to claim 33, wherein both the object-side surface and the image-side surface of the plastic aspherical lens are aspheric surfaces.

35. The zoom lens according to claim 1, wherein at the wide angle end, a light ray of half angle of view 33° or more is capable of passing through the zoom lens, and the following conditional expression (24) is satisfied $$2.6 < f_T/f_W < 5.0 \qquad (24)$$

where, $f_T$ denotes a focal length of the overall zoom lens system at the time of infinite object point focusing at the telephoto end, and $f_W$ denotes a focal length of the overall zoom lens system at the time of infinite object point focusing at the wide angle end.

36. The zoom lens according to claim 1, wherein the second lens unit includes a single lens having a positive refractive power which is disposed nearest to the object side in the second lens unit, and a cemented lens of a negative lens and a positive lens in order from the object side, and the aperture stop is positioned between the single lens and the cemented lens in the second lens unit.

37. An image pickup apparatus comprising:

a zoom lens; and an image pickup element which has an image pickup surface, and which converts an image formed on the image pickup surface by the zoom lens, to an electric signal, wherein the zoom lens is the zoom lens according to claim 1.

* * * * *